United States Patent
Bonneau et al.

(10) Patent No.: US 6,678,695 B1
(45) Date of Patent: Jan. 13, 2004

(54) MASTER DATA MAINTENANCE TOOL FOR SINGLE SOURCE DATA

(75) Inventors: Scott Bonneau, Austin, TX (US); Jeremy Weinrib, Austin, TX (US)

(73) Assignee: Trilogy Development Group, Inc., Austin, TX (US)

( * ) Notice: Subject to any disclaimer, the term of this patent is extended or adjusted under 35 U.S.C. 154(b) by 166 days.

(21) Appl. No.: 09/895,442

(22) Filed: Jun. 29, 2001

(51) Int. Cl.$^7$ ............................................... G06F 17/30
(52) U.S. Cl. ..................................................... 707/102
(58) Field of Search .............................. 707/9, 10, 102, 707/104.1; 345/733; 705/1, 7, 26, 27, 37

(56) References Cited

U.S. PATENT DOCUMENTS

| | | | | |
|---|---|---|---|---|
| 5,870,717 A | * | 2/1999 | Wiecha ........................ | 705/26 |
| 5,878,400 A | | 3/1999 | Carter, III ..................... | 705/20 |
| 5,970,475 A | * | 10/1999 | Barnes et al. ................. | 705/27 |

* cited by examiner

Primary Examiner—Diane D. Mizrahi
Assistant Examiner—Apu M Mofiz
(74) Attorney, Agent, or Firm—Hamilton & Terrile, LLP

(57) ABSTRACT

A maintenance tool is used to import and centrally maintain the data and metadata representing catalog items in a catalog database. The maintenance tool is further used to create and maintain constraint-based rule sets defining custom catalogs that are subsets of the items in the database, constraint-based pricing profiles that define custom pricing schemes to be applied by the items in the database, and a primary browse hierarchy that represents the items in the database. The maintenance tool is used to create and maintain accounts for organizations and to assign to each organization a custom catalog and a pricing profile. The maintenance tool republishes the data on a periodic basis to update the custom catalogs and pricing profiles based on additions and modifications to the database, the rule sets, and the pricing profiles, and to generate new custom browse hierarchies from the primary hierarchy. The maintenance tool may be used to generate physical manifestations of the custom catalogs, pricing information and browse hierarchies for exportation to organizations not directly coupled to the catalog database through a network.

45 Claims, 52 Drawing Sheets

| SKU | ATTID | VAL | PRODTYPE ID |
|---|---|---|---|
| 123 | 1 | COMPAQ | 1 |
| 123 | 2 | 500MHZ | 1 |
| 123 | 3 | 512K | 1 |
| 123 | 4 | 56K | 1 |
| 321 | 5 | HP | 2 |
| 321 | 6 | COLOR | 2 |
| 321 | 7 | 10PG/MIN | 2 |
| 321 | 8 | 600DPI | 2 |

*FIG. 3A*

| SKU | ATT#1 | ATT#2 | ATT#3 | ATT#4 |
|---|---|---|---|---|
| 123 | COMPAQ | 500 MHZ | 512 K | 56 K |
| 124 | COMPAQ | 750 MHZ | 1024 K | 56 K |
| 125 | DELL | 500 MHZ | 2048 K | 56 K |

PROD. TYPE = 1 = DESK-TOP COMPUTER

| | ATT#5 | ATT#6 | ATT#7 | ATT#8 |
|---|---|---|---|---|
| 321 | HP | COLOR | 10 PG/MIN | 600 DPI |
| 321 | HP | COLOR | 10 PG/MIN | 300 DPI |

PROD. TYPE = 2 = PRINTER

*FIG. 3B*

PRICING SAMPLE IMPORT FILE

| PART SKU/VENDOR | PRICEBOOK NAME | Price BasePricebook.v3 |
|---|---|---|
| 89110081/MGE | CXDefault | 27116.5000 |
| AT3024SL15/ALZ | CXDefault | 27117.5000 |
| D7989T/HEW | CXDefault | 27118.5000 |
| KTM2X32L70EG/KTC | CXDefault | 27119.5000 |
| 09941747/ADB | CXDefault | 27120.5000 |
| MGC9A/CPC | CXDefault | 27121.5000 |
| FPCEM01AGR/MPM | CXDefault | 27122.5000 |
| D5957A/HEW | CXDefault | 27123.5000 |
| 62800248/MST | CXDefault | 27124.5000 |
| 76920/ADK | CXDefault | 27125.5000 |
| PV1048U6K480/TOS | CXDefault | 27126.5000 |
| SRMNTS00000/SEA | CXDefault | 27127.5000 |
| 6561EAK/IBM | CXDefault | 27128.5000 |
| KCSFC720016/KTC | CXDefault | 27129.5000 |
| 3011405306/AXY | CXDefault | 27130.5000 |
| STT65016/SIM | CXDefault | 27131.5000 |
| 10604/IOM | CXDefault | 27132.5000 |
| KTM24638/KTC | CXDefault | 27133.5000 |
| F3A101/BEL | CXDefault | 27212.5000 |
| 0651096688/MST | CXDefault | 27213.5000 |
| F8E201/BEL | CXDefault | 27214.5000 |
| 8570053/KOD | CXDefault | 27215.5000 |
| D5955A/HEW | CXDefault | 27216.5000 |
| 90H3541/IBM | CXDefault | 27217.5000 |
| DB1501031/NRT | CXDefault | 27218.5000 |
| 6893HAG/IBM | CXDefault | 27219.5000 |
| SCJE0022/SII | CXDefault | 27220.5000 |
| UPI2000C3/WRG | CXDefault | 27221.5000 |
| Z780P/TEK | CXDefault | 27222.5000 |

CONTENTS OF PRICE BOOK

FIG. 6

Commerce Connections                                    Role: Administrator | Logout ?

|                                | Search by Name | Clear Search ? |
|---|---|---|

✱ ORGANIZATION
• Manage Organizations
  Catalog Subsets
  Pricing Profiles
  Specials
  Order Status 🖉 CATALOG MAINT
  All Products
  Browse Hierarchy
  Product Types 🔧 ADMINISTRATION
  Reports
  Users
  Shipping
  Versioning
  Import

*MANAGE ORGANIZATIONS*

| Organization Name ▲ | Contact Person ▽ | Phone ▽ | Enabled ▽ |
|---|---|---|---|
| NeoAcme | Richard A. Grasso | 212-656-3000 | ✓ |
| • Sellco | Mitchell G. Leibovitz | 1-800-737-6778 | ✓ |

[ Create Organization ]

*FIG. 7B-1*

ORGANIZATION DETAILS
•Required Field

•Organization Name: Sellco
•Street 1: 3111 W. Alegheny Ave.
Street 2:
Street 3:
•City: Philadelphia
•State: PA
•Zip: 19132
•Phone: 1-800-737-6778
Fax:

•Contact Name: Mitchell G. Leibovitz
•Contact Phone: 1-800-737-6778
•Contact E-mail: MLeibovitz@pepb
Contact Title:

*FIG. 7B-2*

Primary Shipping Address ☑ Same as Above

- Street 1: 3111 W. Alegheny Ave.
- Street 2:
- Street 3:
- •City: Philadelphia
- •State: PA ▸
- •Zip: 19132
- •Phone: 1-800-737-6778
- Workflow Enabled: X
- Comments:

- Account Representative: Dan Sheridan
- Service Representative: Vaughn Hebron
- Website URL: http://www.sellco.com
- •LogoURL: ../buy/images/sellco
- Enabled: ☑
- Tax Exempt: ☐
- Catalog Subset: Sellco Catalog
- Pricing Profile: Gold Level Pricing
- Specials: View

[ Save ] [ Cancel ]

FIG. 7B-3

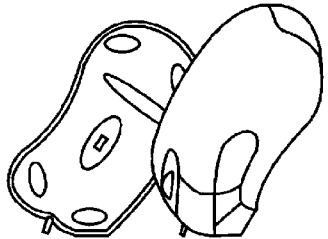

ORGANIZATION
Manage Organizations
Catalog Subsets
Pricing Profiles
Specials
Order Status

CATALOG MAINT
All Products
Browse Hierarchy
• Product Types

ADMINISTRATION
Reports
Users
Shipping
Versioning
Import

Search by Name | Clear Search

PRODUCT TYPES
Type Name ▲
- Battery
- Cable
- Camcorder
- Carrying Case
- Cassette Deck
- CD Player
- CDs and DVDs
- Chassis
- Controller Card
- Desktops and Towers Create Product Type Page: |◄| ◄ 1 ► |►| of 8

*FIG. 9A-2*

PRODUCT TYPE DETAILS

Product Type Name: Battery

| Globally Searched* | Multivalued | Attribute | Type | |
|---|---|---|---|---|
| ☑ | ☐ | Availability | Integer ▶ | Delete |
| ☐ | ☐ | Base Warranty | String ▶ | Delete |
| ☐ | ☐ | Battery Capacity | Float ▶ | Delete |
| ☐ | ☐ | Battery Capacity UOM | String ▶ | Delete |
| ☐ | ☐ | Battery Technology | String ▶ | Delete |
| ☐ | ☐ | Battery Voltage | Float ▶ | Delete |

Search by Attribute   Clear Search

| STEP ② SET ATTRIBUTE VALUES | | Search by Attribute | Clear Search | ② |
|---|---|---|---|---|
| Attribute | | Value | | |
| Availability | = | | | |
| Base Warranty | = | 1 | | |
| Battery Capacity | = | | | |
| Battery Capacity UOM | = | 12 | | |
| Battery Technology | = | in | | |
| Battery Voltage | = | | | |
| Battery Voltage UOM | = | | | |

*FIG. 9B-3*

ORGANIZATION
Manage Organizations
Catalog Subsets
Pricing Profiles
• Specials
  Order Status

CATALOG MAINT
All Products
Browse Hierarchy
Product Types

ADMINISTRATION
Reports
Users
Shipping
Versioning
Import

SPECIALS

| Name ▲ | Description ▽ | Search by Name / Total Value ▽ | Clear Search / All Orgs ▽ | Active ▽ |
|---|---|---|---|---|
| Color Printer Special | Laser Printer and Cartridge | $480.00 | ✓ | ✓ |
| Proliant Server | Proliant Server Special | $700.00 | ✗ | ✓ |
| • Toshiba SAT 4090D | Toshiba SAT 4090D Special | $599.00 | ✗ | ✓ |
| Viper Video Card | Viper Video Card Special | $105.00 | ✗ | ✗ |

[Create Special]

*Catalog Metadata Import File*
*Example - Contains all attributes for all batteries*
*Untitled*

```
   </producttype>
   <producttype name="Battery" displayName="Battery">
      <attribute name="Description" displayName="Description"
type="string" cardinality="single" common="true" required="true"/>
      <attribute name="MarketingText" displayName="Marketing Text"
type="string" cardinality="single" common="true" required="true"/>
      <attribute name="ImageURL" displayName="Image URL" type="string"
cardinality="single" common="true" required="true"/>
      <attribute name="Price" displayName="Price" type="double"
cardinality="single" common="true" required="true"/>
      <attribute name="Availability" displayName="Availability" type="int"
cardinality="single" common="true" required="true"/>
      <attribute name="PartNumber" displayName="Part Number" type="string"
cardinality="single" common="true" required="true"/>
      <attribute name="StartDate" displayName="Start Date" type="string"
cardinality="single" common="true" required="true"/>
      <attribute name="EndDate" displayName="End Date" type="string"
cardinality="single" common="true" required="true"/>
      <attribute name="UPC" displayName="UPC" type="string"
cardinality="single"/>
      <attribute name="BatteryCapacityUOM" displayName="Battery Capacity
UOM" type="string" cardinality="single" enabled="false"/>
      <attribute name="BaseWarranty" displayName="Base Warranty"
type="string" cardinality="single"/>
      <attribute name="BatteryTechnology" displayName="Battery Technology"
type="string" cardinality="single"/>
      <attribute name="CasePackQuantity" displayName="Case Pack Quantity"
type="int" cardinality="single/>
      <attribute name="TechnicalSupportURL" displayName="Technical Support
URL" type="string" cardinality="single"/>
      <attribute name="TechnicalSupportPhoneNumber" displayName="Technical
```

*FIG. 10A-1*

Support Phone Number" type="string" cardinality="single"/>
<attribute name="Category" displayName="Category" type="string" cardinality="single" common="true"/>
<attribute name="BatteryCapacity" displayName="Battery Capacity" type="double" cardinality="single"/>
<attribute name="URL" displayName="URL" displayName="URL" type="string" cardinality="multiple"/>
<attribute name="BatteryVoltage" displayName="Battery Voltage" type="double" cardinality="single"/>
<attribute name="Class" displayName="Class" type="string" cardinality="single" common="true"/>
<attribute name="BatteryVoltageUOM" displayName="Battery Voltage UOM" type="string" cardinality="single" enabled" enabled="false"/>
<attribute name="LanguageLocalization" displayName="Language Localization" type="string" cardinality="multiple"/>
<attribute name="ProductFamily" displayName="Product Family" type="string" cardinality="single"/>
<attribute name="ManufacturerSku" displayName="Manufacturer Sku" type="string" cardinality="single"/>
<attribute name="GeographicLocalization" displayName="Geographic Localization" type="string" cardinality="multiple"/>
<attribute name="ParentManufacturer" displayName="Parent Manufacturer" type="string" cardinality="single"/>
<attribute name="ProductLineSeriesModel" displayName="Product Line Series Model" type="string" cardinality="single"/>
<attribute name="ParentSku displayName="Parent Sku" type="string" cardinality="single"/>
<attribute name="WarrantyInformation" displayName="Warranty Information" type="string" cardinality="multiple"/>
<attribute name="ManufacturerDescription" displayName="Manufacturer Description" type="string" cardinality="single"/>

*FIG. 10A-2*

Sample Catalog Import File
Untitled
<part sku="DLLM" vendor="BAT" productType="Battery">
    <attribute name="ImageURL" value="Images/sample/BAT/DLLM.jpg/>
    <attribute name="Availability" value="0"/>
    <attribute name="Price" value="512.2"/>
    <attribute name="StartDate" value="20000101"/>
    <attribute name="EndDate" value="20010101"/>
    <attribute name="Category" value="Batteries/Adapters"/>
    <attribute name="Class" value="Laptop"/>
    <attribute name="Description" value="Battery for Dell Latitude LM Lithium=Ion"/>
    <attribute name="ManufacturerSku" value="DL-LM"/>
<attribute name="PartNumber" value="DL-LM"/>
    <attribute name="ProductLineSeriesModel" value="LM"/>
    <attribute name="ManufacturerDescription" value="Battery for Dell Latitude LM Lithium-Ion"/>
    <attribute name="BatteryTechnology" value="Lithium Ion"/>
    <attribute name=" ProductFamily" value="Latitude"/>
    <attribute name="URL" value="xxx"/>
</part>

FIG. 10B

MASTER DATA MAINTENANCE TOOL FOR SINGLE SOURCE DATA

CROSS REFERENCE TO RELATED APPLICATIONS

This application relates to application Ser. No. 09/1884,179 filed on Jun. 18, 2001, entitled "Rules Based Provision of Custom Pricing for Multiple Entities" and naming Scott Bonneau, Michael Nonemacher and Jeremy Weinrib as inventors, the application being incorporated herein by reference in its entirety.

This application relates to application Ser. No. 09/884,216 filed on Jun. 18, 2001, entitled "Rules Based Custom Catalogs Generated from a Central Catalog Database for Multiple Entities" and naming Scott Bonneau, Michael Nonemacher and Jeremy Weinrib as inventors, the application being incorporated herein by reference in its entirety.

This application relates to application Ser. No. 09/884,180 filed on Jun. 18, 2001, entitled "Logical and Constraint Based Browse Hierarchy with Propagation Features" and naming Scott Bonneau, Michael Nonemacher and Jeremy Weinrib as inventors, the application being incorporated herein by reference in its entirety.

This application relates to application Ser. No. 09/884,375 filed on Jun. 18, 2001, entitled "Browse Hierarchies Customized for Rules Based Custom Catalogs" and naming Scott Bonneau, Michael Nonemacher and Jeremy Weinrib as inventors, the application being incorporated herein by reference in its entirety.

This application relates to application Ser. No. 09/886,691 filed on Jun. 18, 2001, entitled "Rules Based Provision of Custom Pricing for Multiple Entities" and naming Scott Bonneau and Michael Nonemacher as inventors, the application being incorporated herein by reference in its entirety.

BACKGROUND OF THE INVENTION

1. Field of the Invention

The invention relates to the field of on-line catalogs, and more particularly to centrally maintaining the data representing items of an on-line catalog so that multiple applications can operate on the same data to produce uniform results for a number of different entities.

2. Description of the Related Art

With the advent of Internet based commerce, organizations on both the buy and sell side of business-to-business (B2B) procurement relationships have sought to harness computer networks as a means for automating the procurement process between them. To facilitate e-commerce, and particularly e-procurement, suppliers of goods and services have developed electronic catalogs by which potential buyers can electronically receive and display information regarding the goods and services offered by the supplier, including descriptive information, pictures and prices.

For many reasons, a seller does not often find it desirable to supply the same catalog to all buyers. It may be preferable for a catalog targeted to businesses to have a different product focus than a catalog for individual consumers, and the scope of products in a catalog may vary from one type of business to another, as well as from one type of consumer to another. For example, the types of computers and peripherals offered to businesses may provide higher performance and as a result are more costly than computer equipment targeted toward consumers. The types of goods and services marketed to one type of business often vary significantly from those targeted toward another type of business. Moreover, buyers that purchase high volumes of products/services will often negotiate unique pricing agreements with sellers that afford significant discounts compared to lower volume purchasers. Thus, it would be highly desirable from the seller's perspective for each buyer or group of buyers to have their own unique catalog, one that is customized to reflect the individual product interests of each customer or customer group, as well their unique business processes and relationships.

For a seller carrying many different items (or providing many classes and types of services), maintaining even one version of an e-catalog having one pricing scheme can be extremely difficult. To maintain several custom versions of an electronic catalog, to each of which multiple pricing schemes may be applied, a physical manifestation of each custom version for each pricing scheme is typically created and each version must be maintained and updated as the catalog data and pricing schemes change. Each time a product or service is added, its attributes or attribute values are changed, or the pricing scheme changes, every physical manifestation of a version of the catalog must be individually updated to ensure that each version reflects the changes in the catalog data and pricing. Each version essentially is obsolete until updated.

Although each version of an electronic catalog is maintained by computer, the fact that an update must be performed for each existing version of the catalog can be time-consuming, labor intensive and prone to error. Moreover, updating multiple versions of the catalog each having the potential for multiple pricing schemes is made even more onerous because they typically reside at different physical locations, to many of which the seller has no direct access. For example, some versions of the catalog may have been published to buyers' proprietary retail web sites, some to public marketplace web sites and still other versions to procurement networks. These common repositories for at least a subset of a seller's catalog information typically are not directly accessible to the seller for making direct updates to the catalog information. Rather, catalog updates for these buyers typically must occur somewhat indirectly and through the cooperation of the buyer. In these contexts, the buyer usually performs the ultimate integration of the custom versions of the catalog into the buyer's web site or procurement network.

Thus, for the seller to provide customized versions of its catalogs to all of its potential customers, prior art techniques have required the seller to assume a tremendous administrative burden to maintain the various versions of and pricing schemes for its catalog, leading to discrepancies and errors. For example, some versions may continue to include products or services no longer offered by the seller. Another error that can occur is that some of the prices in a version of the catalog have become obsolete. Buyers attempting to purchase products or services still in the catalog but no longer available through the seller will not be happy that they were inconvenienced in such a manner. Obsolete prices can mean lost money to a seller if new higher prices are not reflected by a custom version of the seller's catalog. Thus, trying to maintain and update so many versions of a catalog becomes risky as well as labor-intensive, which tends to offset many of the advantages of providing electronic catalogs.

Another problem faced by sellers is how to hierarchically organized the items for each version of the catalog for browsing by potential buyers. Because each version of the catalog may contain a different scope of the set of catalog items, browsing hierarchies are preferably created for each version of the catalog. It is preferable that the scope of the browse hierarchy is reasonably coextensive with the scope of the items in the catalog with which it is associated.

It would be desirable from the seller's perspective if the seller had a single tool by which all catalog data could be maintained in a central database and in one physical location. It would be further desirable if customized versions of its catalogs, custom-pricing profiles, and custom browse hierarchies could all be generated using the centrally maintained database. Moreover, it would be desirable if the single tool could also be used to maintain customer accounts for each of its various buyers and buyer groups, including the assignment of each buyer or buyer group to a version of the catalog, a pricing scheme and a browse hierarchy having a scope reasonably coextensive with the assigned catalog version. Finally, it would also be desirable if the seller were coupled to the catalog database through a network such as the Internet, by which seller-authorized users could maintain the database, establish buyer accounts, and present the customized versions of its catalog data to its buyers on a virtual basis, rather than publishing and delivering physical manifestations of the customized versions.

SUMMARY OF THE INVENTION

One embodiment of the maintenance tool of the invention imports data representative of catalog items into a database. The data is stored in a format that facilities maintenance of the data. Rule sets are established that define the scope of custom catalogs, each of which is published from the data in the database for one or more organizations. In one embodiment, a primary browse hierarchy is established that is representative of the items represented by the data in the catalog. Custom browse hierarchies are generated for each of the custom catalogs from the primary hierarchy to be representative of the scope catalog items comprising the custom catalog for which it is generated. In one embodiment, pricing profiles are established that specify none, one or more pricing adjustments to be made to a subset of the items in the database. The adjustments are made to initial prices established for the items in the database. Each customer is assigned to one of the pricing profiles.

BRIEF DESCRIPTION OF THE DRAWINGS

The maintenance tool may be better understood, and its numerous objectives, features and advantages made apparent to those skilled in the art by referencing the accompanying drawings. The use of the same reference number throughout the several figures designates a like or similar element.

FIG. 3a illustrates an example of how the data is arranged in the database to facilitate maintenance.

FIG. 3b illustrates how the data of FIG. 3a is transformed at the time of publication to facilitate rules-based searching.

FIG. 6 provides a sample listing for a price book that demonstrates the tab-delimited format used to represent the price book as stored.

FIGS. 7a–b are screen shots for one embodiment of the maintenance tool GUI that illustrate the process by which accounts are set up and managed for individual organizations.

FIG. 10 provides a sample listing of a file format by which information for a catalog item can be imported into the catalog database using one embodiment of the maintenance tool.

DETAILED DESCRIPTION

Overview

Figure 1:
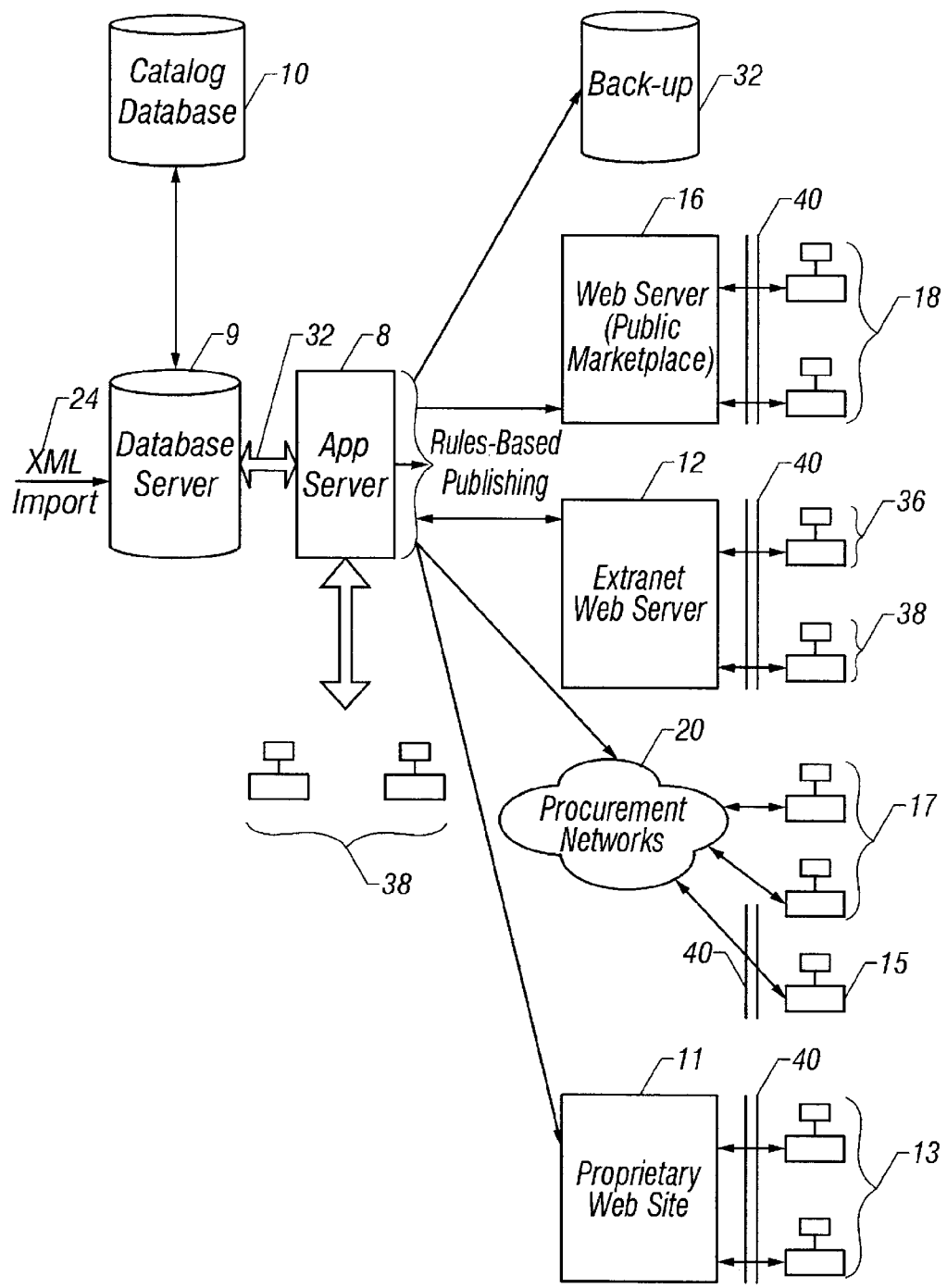
FIG. 1 is a high-level block diagram of a general embodiment of an apparatus for providing custom catalogs, custom pricing and customized browse hierarchies

One embodiment of the method and apparatus of the invention, seller-authorized users are provided with a GUI (graphical user interface) that permits them to import catalog data descriptive of catalog items in the form of data and metadata. The catalog database consists of data representing some or all of the products or services (i.e. items) offered by the seller. Each catalog item in the database is categorized by a product type having a set of attributes (i.e. metadata) and a unique set of values for those attributes (i.e. data). Each item is identified with a unique SKU and is represented in the database by its SKU and each of its attribute values. Descriptive information (e.g. descriptive text, pictures, and the like) normally associated with the catalog display of items can also be associated with each item SKU. The data and metadata are stored in a format that facilitates importation and maintenance. Seller-authorized users are able to alter, expand and add data and metadata to the database through the GUI.

In one embodiment of the maintenance tool, seller-authorized users are able to set up buyer accounts that identify the buyers through a unique buyer identifier. In setting up the account for each buyer or buyer group, the users can also associate the buyers with one of a plurality of custom catalogs, one of a plurality of pricing profiles applicable to the items in their custom catalog, and a browse hierarchy for browsing the items in their custom catalog. The assignment is accomplished by associating each of the buyers or buyer groups with an identifier that uniquely identifies the custom catalog, the pricing profile and the browse hierarchy to which they are assigned. Each item is categorized using a product type having a set of attributes and a unique set of values for those attributes. Each item is identified with a unique SKU, and is represented in the database by its SKU and each of its attribute values. Also associated with each item SKU is descriptive information (e.g. descriptive text, pictures, and the like) normally associated with the display of such items in a catalog.

In one embodiment, the seller-authorized users are able to develop the custom catalogs available for assignment to buyers. A buyer's custom version of the seller's catalog consists of a subset of the items in the catalog database, the scope of which has been predefined for each buyer. The scope of each subset of items, and therefore the scope of each custom version of the catalog, is precisely defined by a set of rules that is developed by a user through the GUI. The user associates each set of rules with a unique identifier, and the user assigns each buyer to one set of rules through the associated identifier. Those of skill in the art will recognize that some buyers will have common product or service interests and therefore will share the same customized catalog, and thus will be assigned to the same set of rules by a common identifier. Each set of rules constrains a search of the database based on a product type and a set of attribute values, and when the search is executed returns a set of SKUs from the catalog database. Each SKU number identifies a unique item consisting of a unique set of attribute values. Based on the rule sets established by the seller-authorized users, the custom catalogs are generated as disclosed in the cross-referenced U.S. Patent Application entitled "Rules Based Custom Catalogs Generated from a Central Catalog Database for Multiple Entities."

In one embodiment of the maintenance tool, a seller authorized buyer is able to create a primary hierarchy that consists of nodes labeled to identify various classes and categories (including sub-classes and sub-categories) of catalog items in the database. The user specifies the label, and can define those catalog items falling under each node by specifying particular attributes of items in the database and permissible values for those attributes. In one embodiment, the maintenance tool GUI enables the user to create an expressive and flexible hierarchical scheme disclosed in the cross-referenced U.S. Patent Application entitled "Logical and Constraint Based Browse Hierarchy and Propagation Features." One of the benefits of this hierarchical scheme is that it permits the expression of items falling under a node in the hierarchy based on logical groupings as well as by constraints on item attributes and their values. The primary hierarchy is then used to generate a customized browse hierarchy for each of the custom catalogs established by seller-authorized users as described in the cross-referenced U.S. Patent Application entitled "Browse Hierarchies Customized for Rules Based Custom Catalogs."

In one embodiment, the users establish through the maintenance tool the initial pricing for each item in the form of a master price book, which can be implemented as a table in memory. The tool permits the users to establish variations of the master price book that can be created and maintained hierarchically with the master price book. Users are then able to establish adjustments to the initial pricing for an arbitrary number of buyers or buyer groups in the form of the pricing profiles. In one embodiment, users specify the adjustments in the form of a percentage or an absolute value in currency, both in the positive and negative direction. Those of skill in the art will recognize that an adjustment could also be specified as a completely new substitute price, although this may not be the most efficient way of maintaining pricing adjustments. Whole pricing adjustments typically can be more efficiently made to the price book, either to the master price book, or to a variation thereof.

The users give each pricing profile an identifier as they are created, and the users assign each buyer to one pricing profile by way of a profile identifier. The user specifies each pricing profile as a set of search rules and one or more pricing adjustments. As each of the search rules is sequentially executed, a set of SKUs is returned. Each of the returned SKUs is stored in a separate entry along with a pricing adjustment as specified in the profile and the pricing profile identifier. This process is performed for all pricing profiles to establish the information by which prices may be provided for each buyer. Whenever a set of catalog items is to be provided to a particular buyer, the set of SKUs representing items (or services) to be provided to the buyer, the buyer's pricing profile ID and the appropriate price book are used to calculate the prices for each SKU in accordance with the cross-referenced U.S. Patent Application entitled "Rules Based Provision of Custom Pricing for Multiple Entities."

Each particular buyer or group of buyers is assigned only one pricing profile and thus only one pricing profile identifier. Those of skill in the art will recognize that some buyers will have common pricing arrangements with a seller and therefore can share the same pricing profile. The set of rules defining each pricing profile is maintained independently from the catalog database. Thus, when the catalog database is modified, pricing adjustments for all SKUs in the database can be updated concurrently by simply re-executing all of the pricing profiles on the modified database. Creating and maintaining pricing profiles independently from the database also permits the existing pricing profiles to be modified, and new profiles to be created, without affecting the catalog database. Once again, new pricing adjustments can be assigned to SKUs simply by re-executing (i.e. re-publishing) the pricing profiles. Finally, through the maintenance tool users are able to modify, add or delete the base prices for items in the master price book. The user can also create new price books that consist of only the modifications, but which are hierarchically related to (and therefore contain) the remaining base prices of its ancestors, including the master plan.

In one embodiment of the maintenance tool, seller authorized users are able to perform a virtual publication process on a regularly scheduled basis to update all of the custom versions of the catalogs, their associated browse hierarchies, and all of the pricing profiles to reflect any changes made to the catalog database since the last update. During the publication process, the catalog database is temporarily locked so that no further modifications can be made to the catalog database, until the virtual publication process is complete. The searches to establish the custom catalogs, the pruning required to generate custom browse hierarchies and the searches required to establish pricing information in accordance with the pricing profiles are all executed. As a result, any modifications to the data and metadata in the database, any newly created rule sets and pricing profiles as well as any modifications to existing ones, or any modifications to the primary hierarchy will be reflected in the re-generated custom catalogs, browse hierarchies and pricing information.

In one embodiment, the seller-authorized users are coupled to the seller's catalog database through an extranet, which is a network connection established between a terminal and the maintenance tool over the Internet. In this embodiment, seller-authorized users access the maintenance tool through a web browser and an Internet service provider (ISP). The inquiries are received by seller's web server application and handled by the seller's application program, including the maintenance tool. In another embodiment, the seller-authorized users can access the maintenance tool through a terminal directly coupled to an application server running the maintenance tool application.

In one embodiment, the maintenance tool distinguishes between buyers who are coupled to the database through an extranet as previously described, and those buyers not directly coupled to the database. For those buyers coupled to the database through an extranet, buyer's make catalog inquires through a web browser coupled to the Internet through an ISP. The inquiries are received by the seller's web server application and processed by the seller's application program in conjunction with the account information maintained by the maintenance tool. In this way, the seller can directly control what data from the catalog database each seller sees. Thus, versions of the catalog data customized for a particular buyer, including pricing, are essentially logical constructs; the scope of catalog data, pricing and the browse hierarchy presented to the buyer can be constrained based on rules specific to that buyer as established and maintained by the maintenance tool.

In another embodiment, the seller-authorized users are able to export custom versions of the catalog database, including pricing information and browse hierarchies to external buyers not coupled to the seller's catalog database through an extranet connection. The scope of the catalog data comprising these exported custom versions are also constrained to the set of SKUs constrained by the set of rules assigned to the buyer using the maintenance tool, and generated during the virtual publication process. The difference is, the maintenance uses the set of SKUs to create a complete physical manifestation of the custom version of the seller's catalog for the buyer (rather than doing so on a query by query basis as in the extranet embodiment). The maintenance tool can then be used to convert this physical manifestation of the buyer's custom version of the catalog data (consisting of all descriptive and attribute information for each SKU in the set) into a format specified by the buyer (e.g. XML) for physical exportation to the buyer for incorporation into buyer's site.

The maintenance tool permits the set of rules defining each custom version of the catalog, pricing and the primary hierarchy to be maintained independently from the catalog database. Thus, when the catalog database is modified using the maintenance toll, all custom catalogs can be updated concurrently by simply performing the virtual publishing process on the new version of the catalog database. Maintaining the rule sets used to generate a custom catalog for each buyer, the pricing profiles and the primary hierarchy independently from the database also permits the rule sets to be modified for existing buyers and/or created for new buyers without affecting the catalog database.

Structure

Referring to FIG. 1, a high-level block diagram of a general embodiment of an apparatus for providing custom catalogs, custom pricing and customized browse hierarchies is depicted. Catalog database 10 contains the most recent version of the catalog data and metadata assembled and maintained by the seller using the maintenance tool. The catalog data and metadata stored in the database 10 is accessed through queries made to database server 9. Database server 9 can be any server capable computer, including one capable of running SQL Server 7 by Microsoft. Item information can be imported into database 10 using the maintenance tool via import input 24 from manufacturers and vendors of items sold by seller. A format such as XML can be used to represent the imported data for easy manipulation and conversion by the maintenance tool.

Users authorized by the seller may be given access to the database 10 through an the maintenance tool application program running on application server 8, which is in communication with the database server 9 through communications bus 32. The application server 8 can be any server capable computer, including a PC server capable of running the Windows NT operating system. Updates to and maintenance of database 10, can be made directly by the seller-authorized users through the maintenance tool application program and a GUI provided by the maintenance tool. In one embodiment of the invention, the application server 8 communicates with database server 9 over bus 32 using TCP/IP communications protocol and JDBC/ADO database protocols.

The set of arbitrary rules used to define the custom catalogs and the pricing profiles are created by seller-authorized users through the maintenance tool accessed by terminals 38 coupled to application server 8. The rules are physically stored with (although maintained independently from) the catalog data in database 10, and created in one embodiment, created through a GUI that leads the user through the process. The search queries derived from these rules are used by the database server 9 to search for and retrieve the SKUs forming the custom catalogs and to determine to which of the SKUs a price adjustment specified by the pricing profile will be applied. The application formulates the series of queries based on the rules and issues those queries to the database server 9. The database server 9 searches and retrieves a subset of the catalog information in the form of item SKUs in response to the queries and of a scope that is constrained by the rules.

The maintenance tool is used to create buyer accounts and in the process, to assign each custom catalog rule set and each pricing profile to a buyer or buyer group using a unique identifier. Each buyer for whom a custom catalog is generated is assigned to the custom catalog using the identifier of the rule set used to generate the custom catalog. Likewise the maintenance tool is used to assign to the buyer account the appropriate pricing profile. The set of rules a seller-authorized user establishes for a custom catalog using the maintenance tool defines the scope of items for which that particular buyer has an interest. Likewise, the set of rules and adjustments that define a pricing profile for that buyer are developed using the maintenance tool to reflect pricing agreements or schemes established between the seller and the specific buyers. Finally, the primary hierarchy is developed using the maintenance tool GUI, as well as any modifications thereto.

FIG. 1 illustrates that customized versions of the seller's catalog data, including variable pricing, can be provided to buyers using the invention in different modes. One mode in which seller/buyer relationships can be created is by establishing an extranet relationship between the seller and certain buyers. An extranet is simply a business-to-business link between the seller and one or more buyers using the Internet 40. In this case, web server 12 couples buyer-authorized and seller-authorized users to the application server 8 over the Internet 40. Thus, buyer-authorized users can access and browse the seller's catalog data directly using a computer such as a personal computer (PC) 36 running a web browser. An extranet buyer initiates catalog queries through the browser, which are received over Internet 40 by the seller's web server application. The seller services the query by way of the application running on the application server 8. The buyer's access is direct and the seller has direct control over the responses produced by the buyers' inquiries. Thus, the seller can limit the scope of any response to buyer's query simply as a function of the set of SKUs returned for the search defined by the query. Pricing is then calculated for a particular buyer based for those SKUs returned based on the inquiring buyer's assigned pricing profile and the pricing adjustments for those SKUs (if any) as generated by the pricing profile. In this mode, the seller provides a virtual custom catalog for each buyer on a query-by-query basis instead of having to publish a physical manifestation of some subset of the catalog data that comprises each custom version.

Those of skill in the art will recognize that a single server could be used to run both the maintenance tool application as well as a web server application. Because the buyer has direct access to the database 10 through extranet web server 12 and application server 8, any updates made to the virtual custom catalogs including pricing and adjustments to the primary hierarchy used to generate the custom browse hierarchies for the extranet buyers are available immediately upon completion of the publication process.

A second mode in which customized catalogs, including customized pricing can be provided to buyers using the invention is through the process of exportation. One context for which exportation of customized catalogs is appropriate is when a buyer offers its own catalog of items through its own proprietary commercial web site 11. In this case, the buyer may wish to incorporate a subset of the seller's catalog data describing items of the seller that the buyer wishes to sell through its web site 11. Potential purchasers of the buyer's items typically access the buyer's proprietary web site 11 through browsers 13 over Internet 40.

A second possible context for which exportation is applicable is a public marketplace, whereby two or more buyers establish a proprietary web site, through which they offer items including some of the seller's items. As in the previous example, proprietors of the public marketplace may wish to incorporate some subset of seller's items with some pricing scheme into its catalog. Customers of the public marketplace web site access the custom catalog information through browsers 18 over the Internet 40.

Another context in which exportation of customized catalog and pricing is applicable is when a seller wishes to offer some customized subset of its catalog to the many potential purchasers that belong to a private procurement network 20. Member buyers and sellers are authorized to access the procurement network, either directly using terminals 17, or indirectly through Internet 40 using browser 15.

In all of the foregoing contexts, exportation is used because the seller typically does not have direct access to the buyer's web site. Moreover, the catalog data comprising the customized subset of the catalog database and reflecting customized pricing often must be converted to some format of the buyer's specification prior to exportation. This could be a fairly standard format such as a version of XML (eXtensible Markup Language), or it might be a more proprietary format in the case of a procurement network. For the foregoing contexts, because the seller typically does not have direct access to the catalog data maintained by the buyers for the foregoing contexts, the newly generated custom catalog information generated by the seller must be exported to and incorporated by the buyer. Nevertheless, the invention can be used to create and update the exportable manifestations of custom catalogs, including buyer specific pricing, using the same rules-based scheme as applied to the extranet environment. The only difference is that the maintenance tool is used to take the sets of SKUs produced by the publication process to generate for extranet buyers a complete physical manifestation of the custom catalog for exportation.

In both the extranet virtual publishing mode and the physical exportation mode, the fact that the customized catalog customized pricing for a particular buyer is a subset of the items contained in the full catalog database 10 is completely transparent to the buyers. The seller maintains the primary central database 24, the custom catalog rule sets, the pricing profiles and the primary hierarchy using the maintenance tool. From this, customized versions are virtually published to the various extranet buyers, and physical manifestations of the customized versions are exported to external buyers, based on the arbitrary pricing and content rules unique to that customer.

Figure 2:
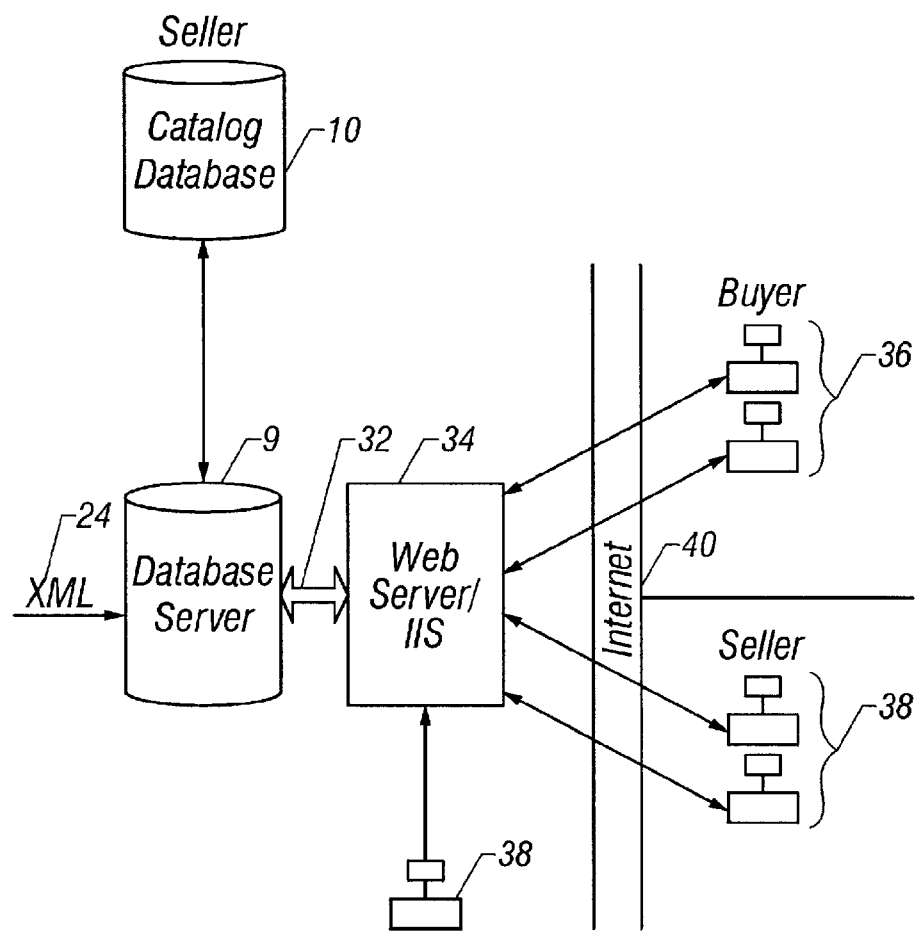
FIG. 2 illustrates one extranet embodiment of the invention.

FIG. 2 illustrates one extranet embodiment of the invention. A database server 9 provides access to catalog database 10. The database server 30 receives queries from application/web server 34 over bus 32 using an appropriate communication and database protocol such as TCP/IP and JDBC/ADO respectively. As previously discussed, the application and the web server application can be run on the same machine. Seller-authorized users can maintain and update the catalog database 10, establish and modify custom catalog rule sets, pricing profiles and a primary hierarchy, and create and modify new extranet accounts with buyers using terminals 38 to access the maintenance tool application. The seller-authorized users can access the maintenance tool directly or over the Internet 40 through the web server application. The users can use the maintenance tool to import new catalog data into database 10 from manufacturers, suppliers, etc. over XML import input 33. The application/web server 34 typically runs an operating system such as Windows NT 4/IIS, available from Microsoft Corporation, or some version of Unix. A more detailed discussion of the format of the catalog data, the rules comprising custom catalogs and pricing profiles, and the GUI used to generate them is presented below.

Those of skill in the art will recognize that database 10 can be coupled to server 34 and to additional servers, if one desires to expand the number of extranet connections to an arbitrary number of buyers. Moreover, the rules-based publishing of custom catalogs and the rules-based pricing of items contained in those catalogs can be used to export customized versions of the catalog data for any number of proprietary web sites, public marketplaces and procurement networks.

As previously discussed, the catalog database 10 is established, updated and modified through importation of vendor/supplier data and/or through direct input by seller-authorized users using the maintenance tool. In one embodiment, catalog data is stored in a database storage medium and can be categorized as catalog data and meta-data. Catalog metadata includes product types and attributes. In one embodiment, each item is represented by a unique SKU ID (identifier) in the catalog database, and belongs to exactly one product type. Unless an attribute is one that is deliberately made common to more than one product type, each attribute belongs to exactly one product type and is identified by a unique attribute ID. Each product type is also uniquely identified with a product type ID. Those of skill in the art will recognize that the most common way to uniquely identify something in a table is with some form of alpha-numeric identifier. Some examples of product type might be personal computer, memory, and hard-drive. Some examples of attributes that might be uniquely associated with such product types might be processor clock speed, memory size, vendor and capacity respectively. Catalog data typically consists of part specific data such as attribute value pairs. Examples are color=blue, size=64 k, processor speed=800 MHz, etc.

FIG. 3a illustrates a simple example of how the data is arranged in the database to facilitate maintenance, and FIG. 3b illustrates how the data of FIG. 3a is transformed at the time of publication to facilitate the rules-based searching by which the pricing adjustments are generated. In FIG. 3a, the data is arranged such that there is only one attribute/value per row. Thus, each item SKU as well as each product type can have multiple rows. For example, the item associated with SKU #123 has a row for each of its associated attributes. Attribute #1 (ATT #1)=vendor, ATT #2=processor clock speed, ATT #3=memory size, ATT #4=modem speed. Item SKU #123 is of product type 1=desktop computer. The item uniquely identified by SKU #321 has a row for each of its 4 attributes. ATT #5=vendor, ATT #6 print type, ATT #7=print speed, ATT #8=print resolution. Item SKU 321 is of product type=2=printer. It should be pointed out that not all attributes must have a value, but for those that do, some embodiments of the application program of the method and apparatus for providing custom prices will force a user to insert a value. Additionally, certain attributes (ATT-IDs) can be linked as common, so that searches can be performed that return, for example, all item SKUs having a value for that common attribute, regardless of product type.

The format illustrated in FIG. 3a is designed to facilitate the creation and maintenance of the catalog data by the maintenance tool. However, it is not optimal for searching for items having certain attribute values. Thus, upon commencement of publication (i.e. when new and/or updated custom catalogs are to be generated and pricing adjustments for all pricing profiles are to be established), the catalog database is locked and the data is converted to the format illustrated in FIG. 3b. A table is created for each product type, and each table comprises just one column per SKU, and a column for each attribute belonging to the product type. The tables of FIG. 3b include some additional item SKUs not shown in FIG. 3a to illustrate that other items can fall under the product type, and that each item SKU has a unique combination of the att/val pairs. The advantage to the converted format is that when searches are performed on the data, the amount of data to be searched has been pared down first based on product type, and then by attribute/value (att/val) pairs.

It should be noted that the conversion process produces a read-only copy of the original database in the search-friendly format. Thus, the conversion process does not disturb the data in the database as configured in the maintenance-friendly format. In fact, once the format conversion process is completed, the original database is unlocked so those seller-authorized users can continue updating the catalog database without disturbing the publishing and exporting processes.

Those of skill in the art will recognize that the examples given by FIGS. 3a and 3b are for illustrative purposes only. For example, there can be an arbitrary number of product types, and an arbitrary number of attributes associated with those product types. Moreover, the alphanumeric representation of the attributes and attribute values are exemplary only, and can be expressed in any format appropriate to expressing and organizing the information in the manner described. For more information regarding the conversion of the database data from that in FIG. 3a to that of FIG. 3b, see cross-referenced U.S. Patent Application entitled "A Method for Building Digital Catalogs Optimized for Maintenance, Descriptiveness, and Fast Search."

Rule sets for custom catalogs are established for each buyer in accordance with the scope of the custom catalog that is appropriate to the particular buyer. Buyers for whom the appropriate scope is the same will be assigned to the same rule set. Each rule set is given an identifier, and each buyer is associated with a particular rule set through the identifier. In one embodiment of the present invention, rules are specified in the form of either an include (INC) or exclude (EXC), and are constrained based on product type and att/val pairs. Each rule is implicitly ANDed together with all other rules for a particular buyer. They are performed sequentially and take the general form:

```
INC/EXC
    All parts where:
        [ATT_Name op ATT_Val]
    (AND)   [ATT_Name opATT_Val]
        ]
``` where ATT_Name equals an attribute identifier, op is an operator {=,>, <, "starts with" or "contains"}, ATT_Val is the value of the attribute to be included or excluded, and the AND is implicit.

Thus, an example search to include all software that is manufactured by Microsoft Corporation and is related to "Windows" could be expressed as follows:

```
INC
    All parts where:
        [Product type = 'software'
            [Vendor = 'Microsoft'
                [Description "starts with" 'Windows']
            ]
        ]
```

This search would return the SKUs for products such as Windows NT®, Windows 95®, Windows 2000® operating systems or applications developed by Microsoft that are described as Windows® compatible. One could add to the search to further narrow the results by excluding all parts described as being Windows 95® compatible. Thus, one can further exclude items that have been included, or include some parts that were previously excluded. For example, one could append to the previous example to include all parts that have a vendor='Oracle.' A set of rules is created using this format for each buyer for whom the seller wishes to provide a customized catalog.

The maintenance tool is also used to create pricing profiles, each profile being assigned to one or more buyers. Each pricing profile consists of a set of rules by which searches can identify items to which specified pricing adjustments are to be applied. For each pricing profile, a price book is referenced to establish the base prices for the profile. Each pricing profile is given a unique identifier, and that identifier is associated with each buyer for which the pricing scheme of that profile is to be applied. In one embodiment of the invention, rules are specified in the form of either an include (INC) or exclude (EXC), and are constrained based on product type and att/val pairs. Each rule is implicitly ANDed together with all other rules for a particular buyer. They are performed sequentially and take the general form:

```
For all parts where:
    [ATT_Name op ATT_Val]
(AND)   [ATT_Name op ATT_Val]
    ]
adjust price by:
    [ADJ_op AMT unit]
``` where ATT_Name equals an attribute identifier, op is an operator {=,>,<, "starts with" or "contains"}, ATT_Val is the value of the attribute to be included or excluded, and the AND is implicit, and where ADJ_op is an adjustment operator {"increase by,""decrease by" or "equals"}, AMT is the amount of the adjustment and unit is the units for the adjustment {US Dollars or %}.

Thus, an example to discount the price of all software that is manufactured by Microsoft Corporation and is related to "Windows" by 10% could be expressed as follows:

```
All parts where:
    [Product type = 'software'
        [Vendor = 'Microsoft'
            [Description "starts with" 'Windows']
        ]
    ]
Adjust price by:
    [decrease by AMT = 15%]
```

The search would return the SKUs identifying items such as Windows NT®, Windows 95®, Windows 2000® or applications developed by Microsoft that are described as Windows® compatible. One could add an additional rule to further narrow the results by adjusting the price back up by 15% on all such parts described as being Windows 95® compatible. Because the rules of each rule set are executed sequentially, any SKU that is associated with more than one adjustment for a profile, because it fell into the scope of more than one search rule, the adjustments are simply made on top of one another. Any arbitrary number of adjustments can be associated with any arbitrary number of SKUs for a given pricing profile. Any arbitrary number of pricing profiles can be created as well.

Of course, another way to adjust the prices of certain items is to change the base price in the master price book for those items. This is only advisable if the base prices for all pricing profiles are to change in the same way. Another way to accomplish this for a specific pricing profile is to create a new price book that includes all of the base prices for items as established in the master price book, except those that have been modified and identified with the new price book. Finally, the adjustment could also be defined as a completely new substitute price as previously mentioned.

Figure 4A:
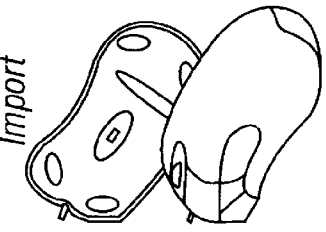
FIG. 4a–4h illustrate screen shots produced by one embodiment of the maintenance tool GUI on a seller-authorized user's web browser by which a rule set is developed.
Figures 1, 4B:
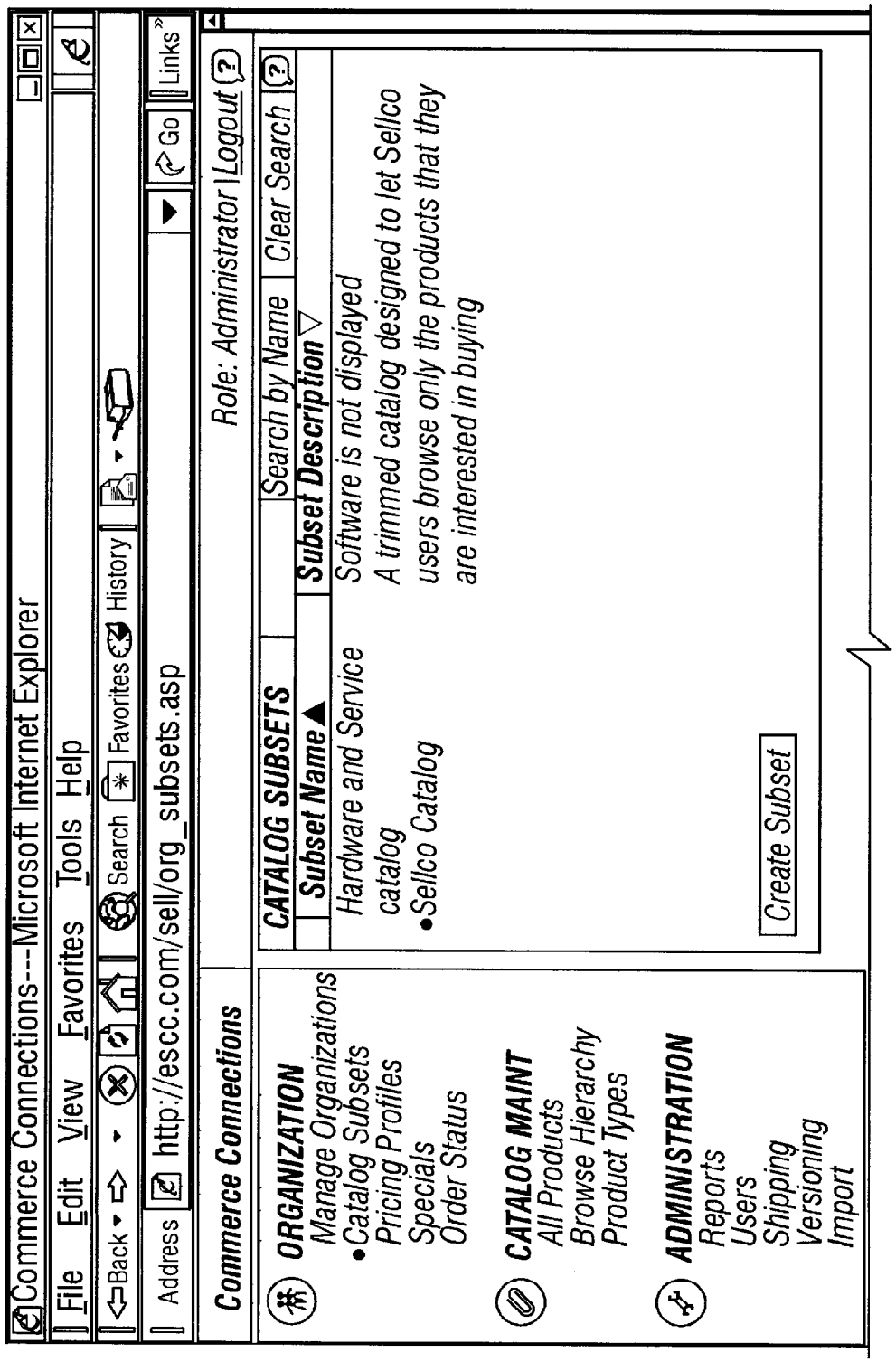
Figures 2, 4B:
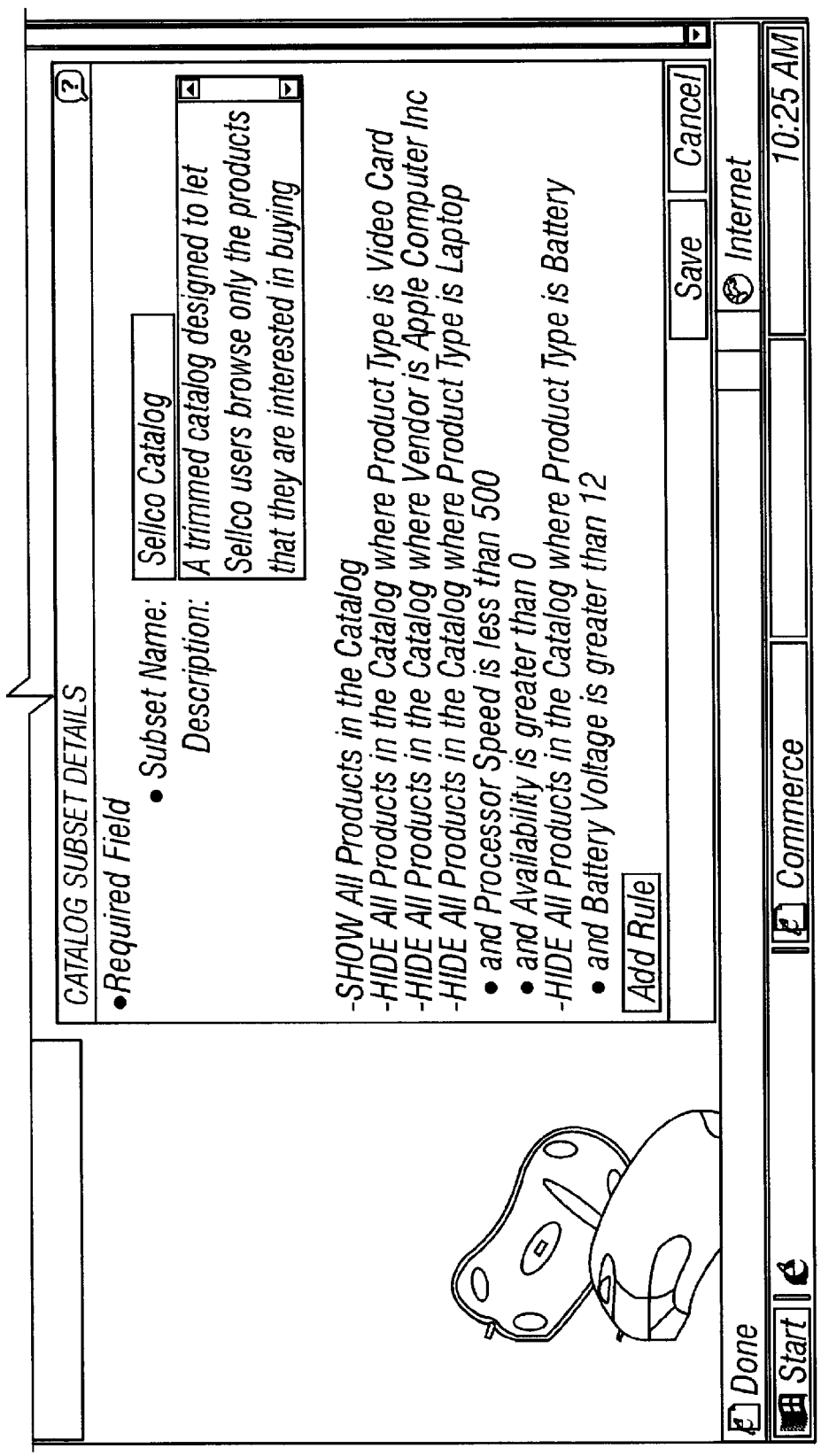
Figures 1, 4C:
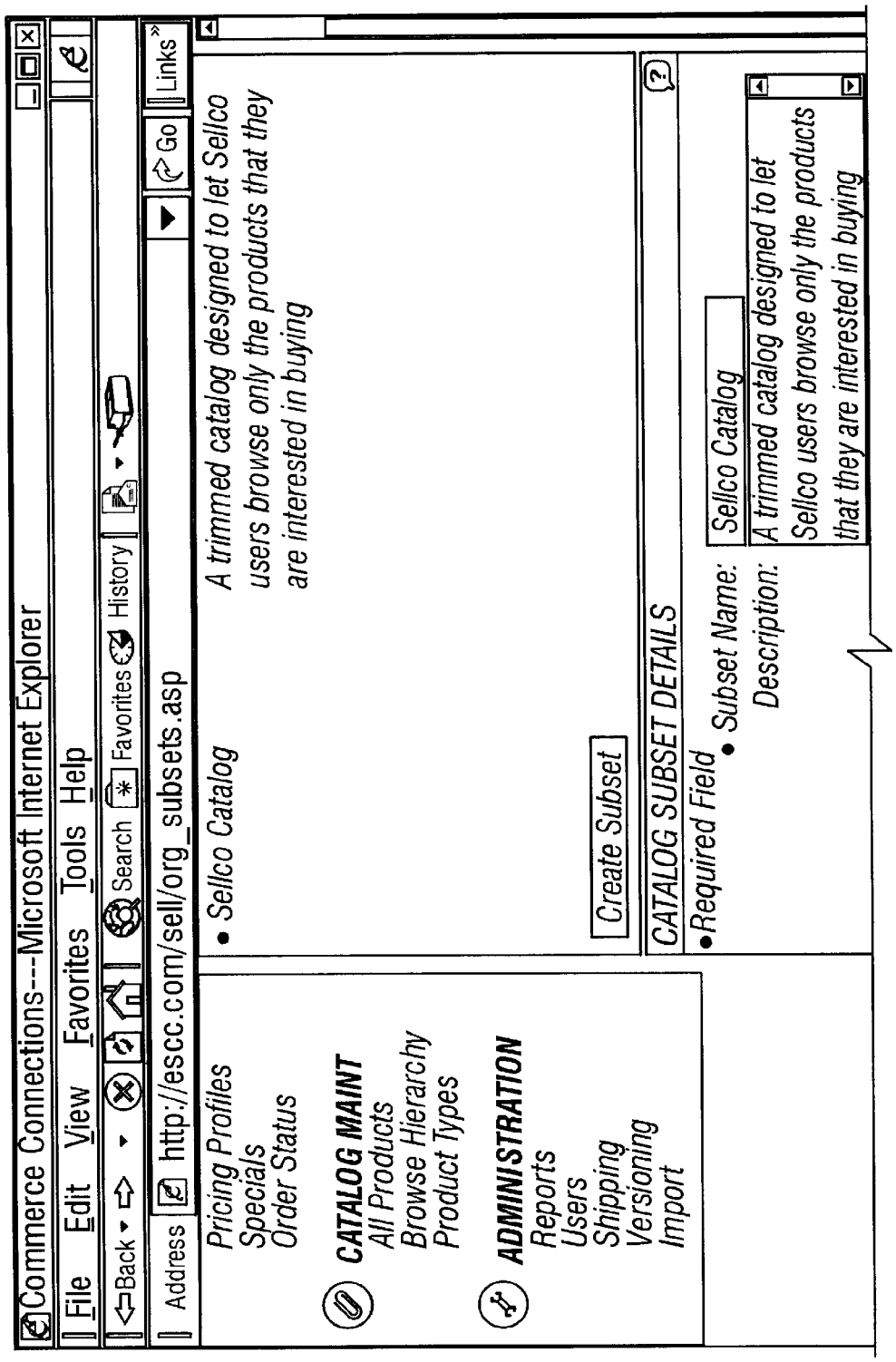
Figures 2, 4C:
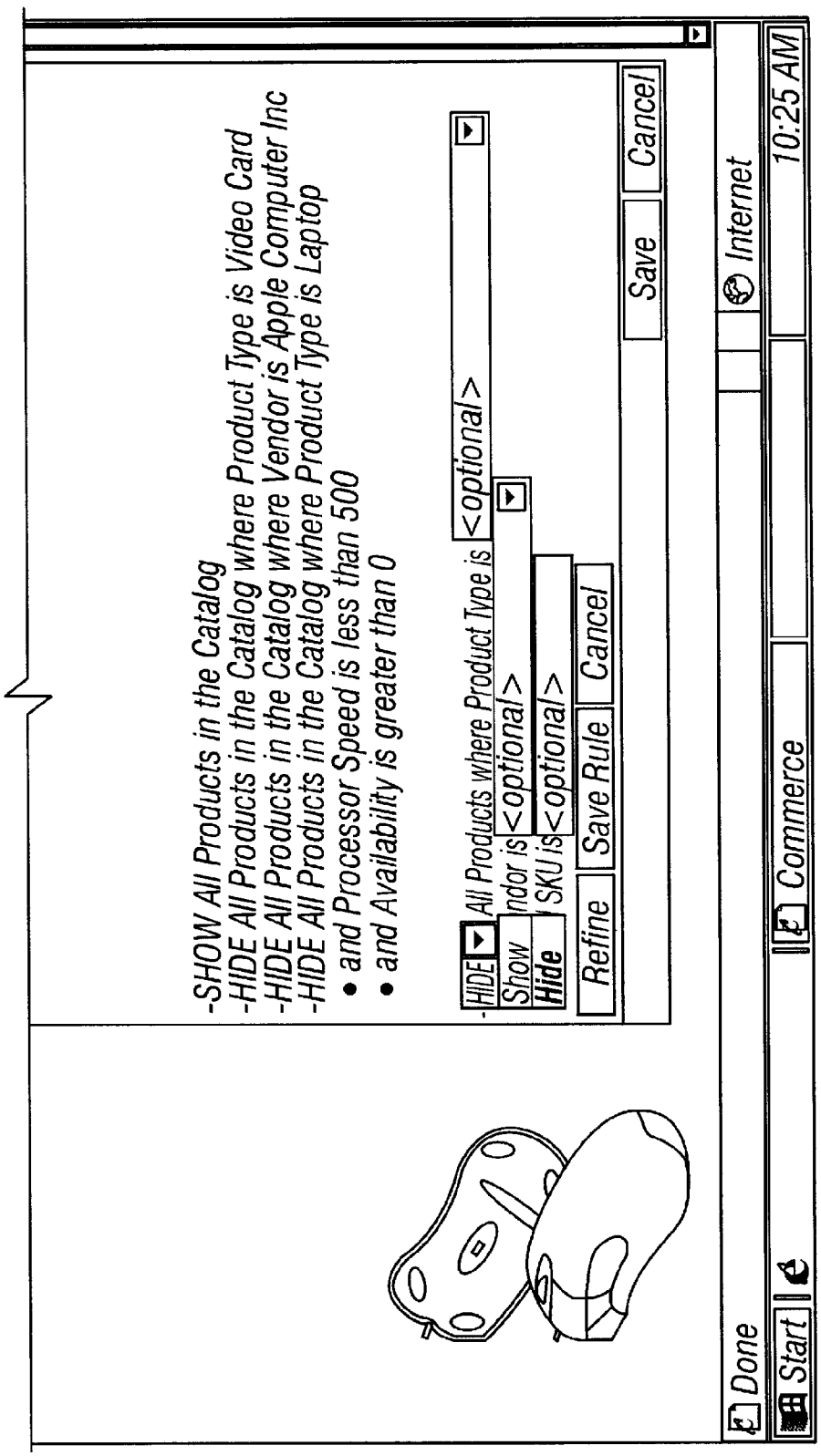
Figures 1, 4D:
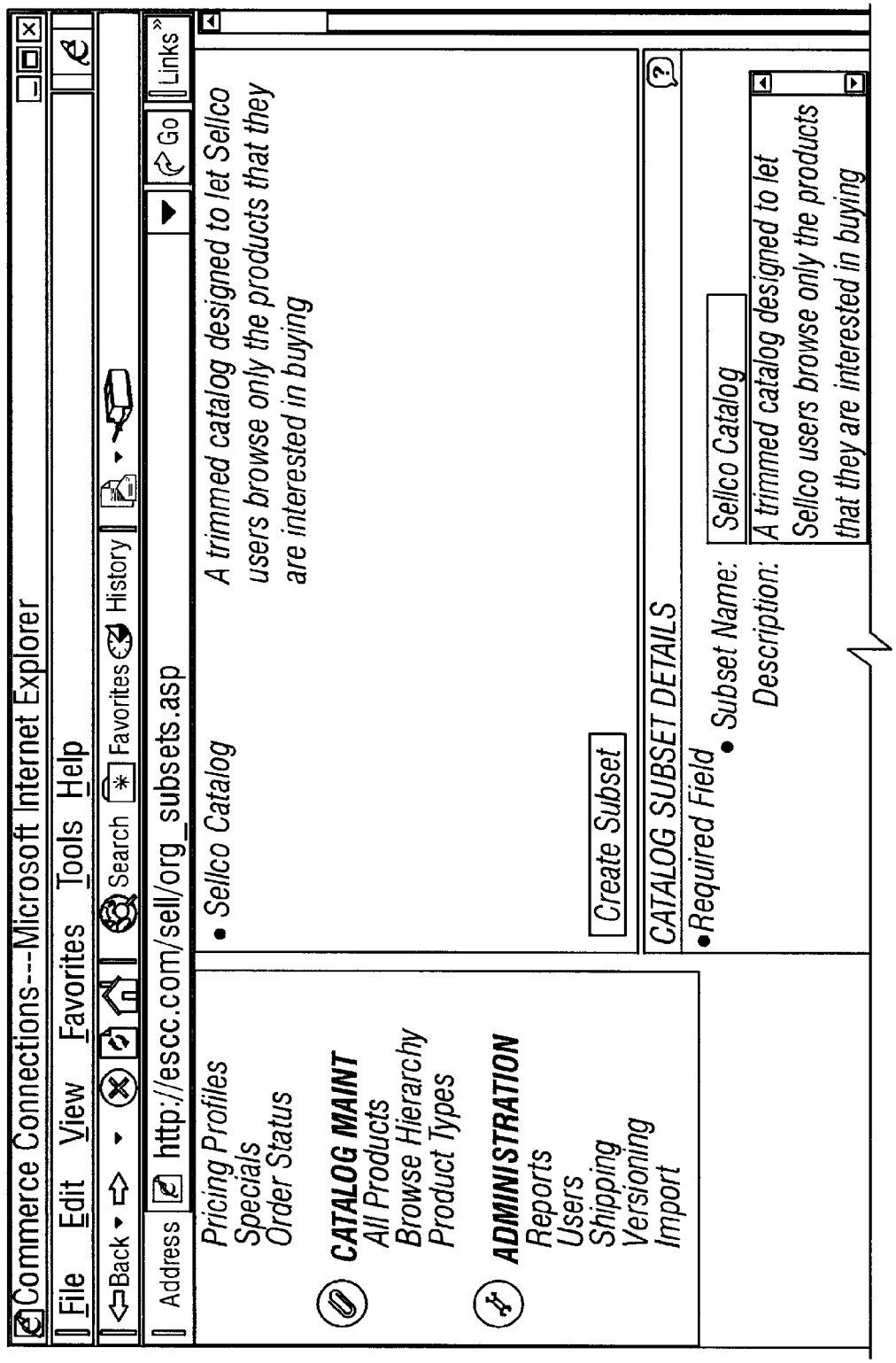
Figures 2, 4D:
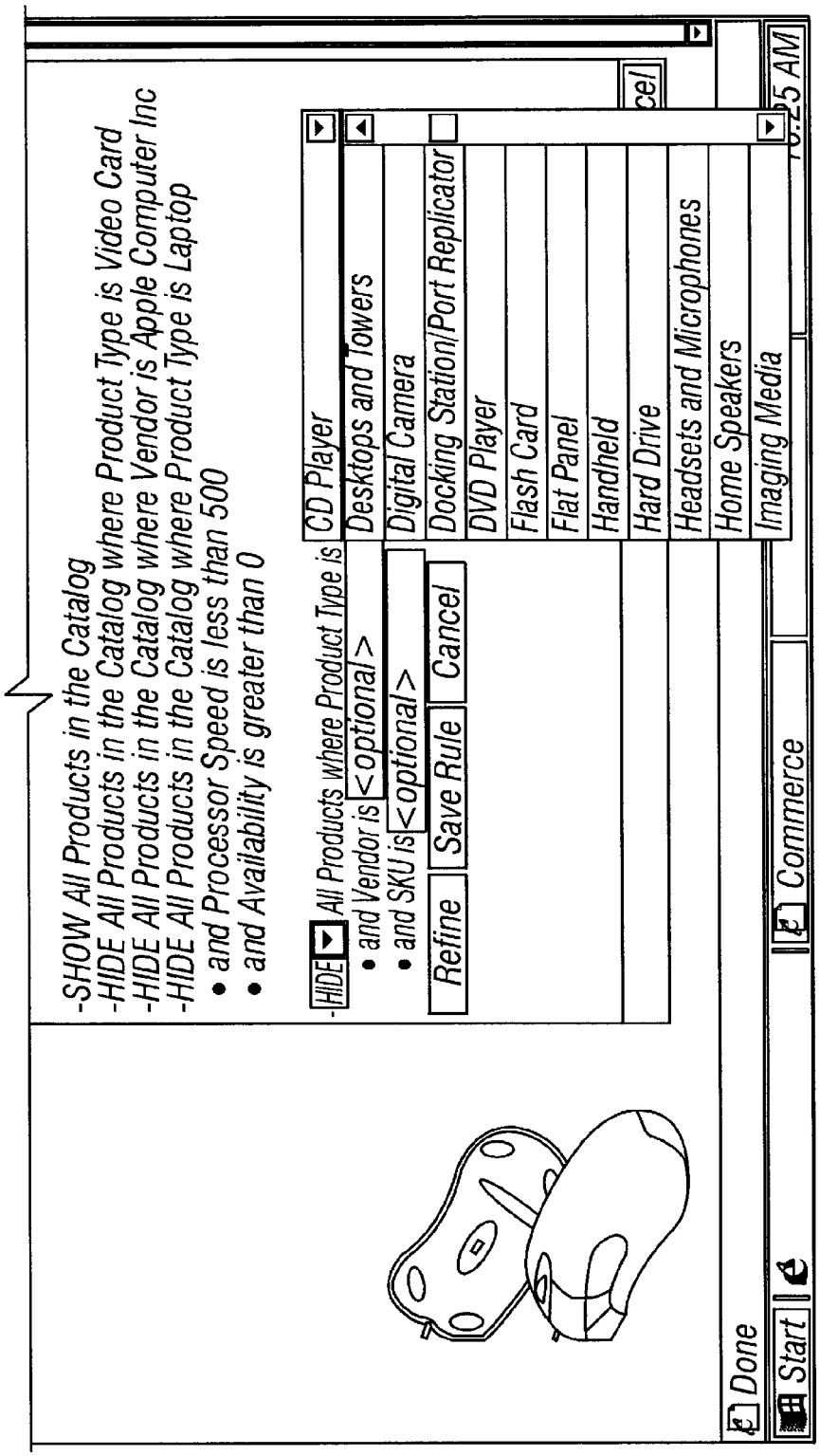
Figures 1, 4E:
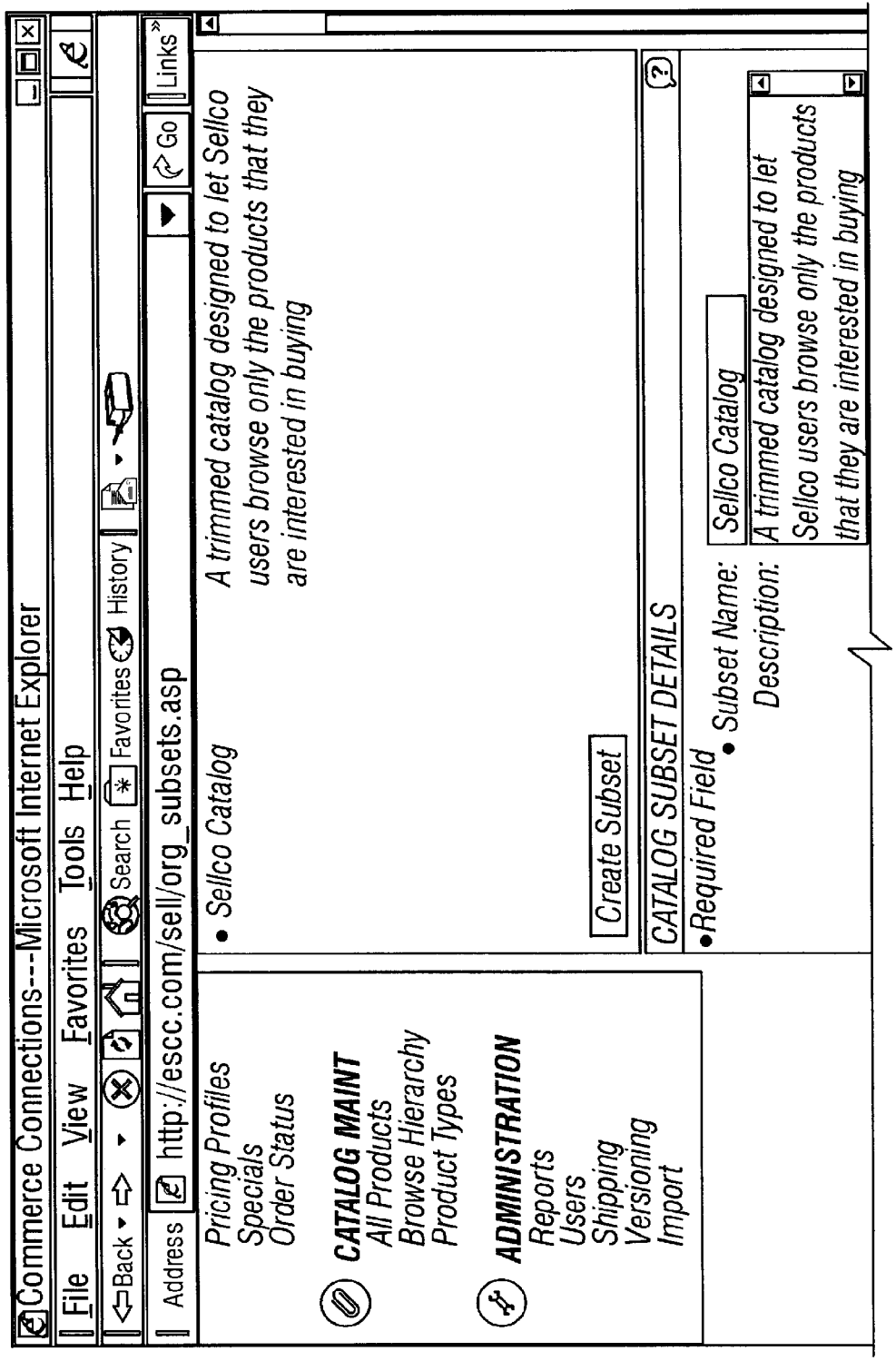
Figures 2, 4E:
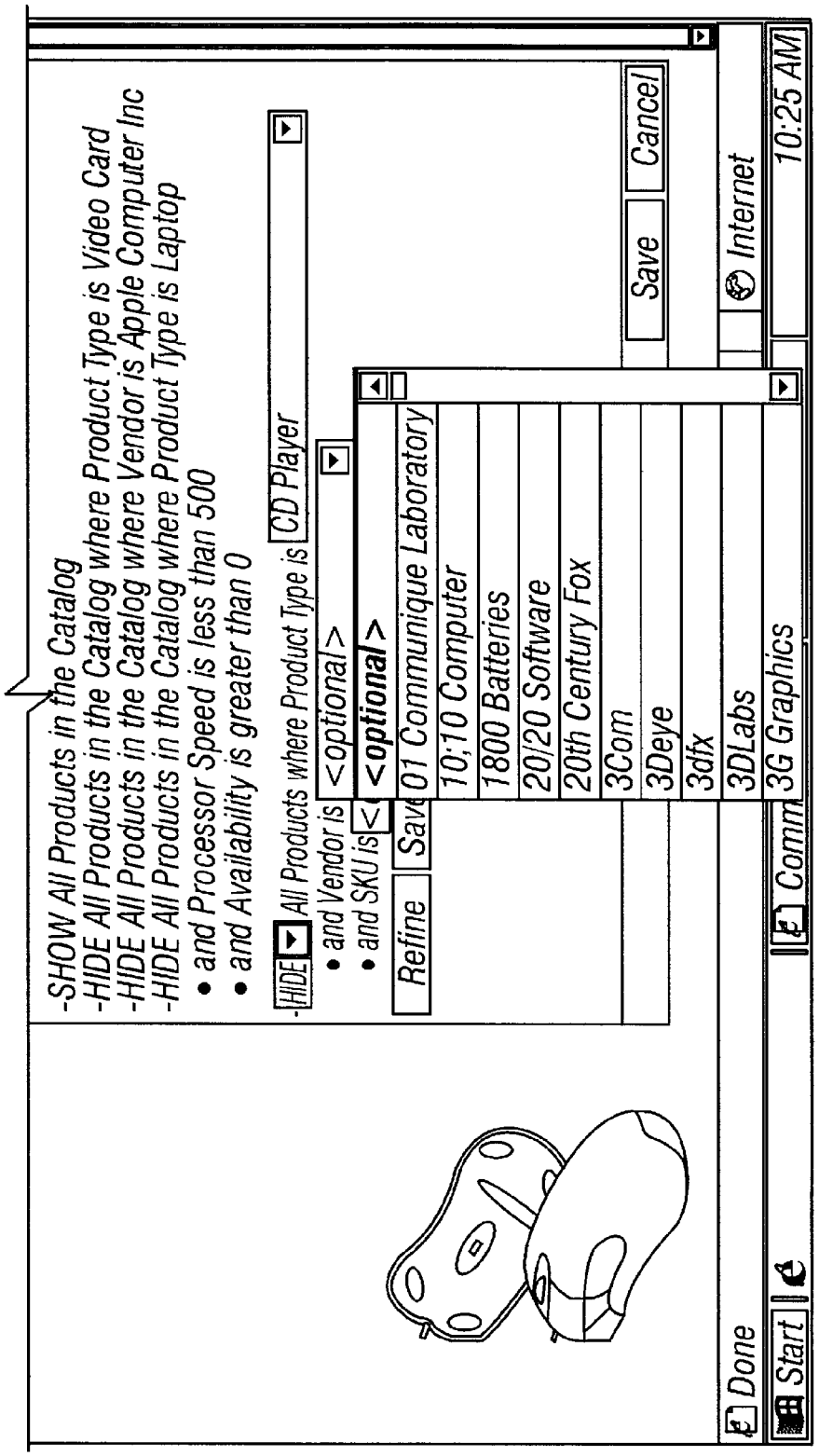
Figures 1, 4F:
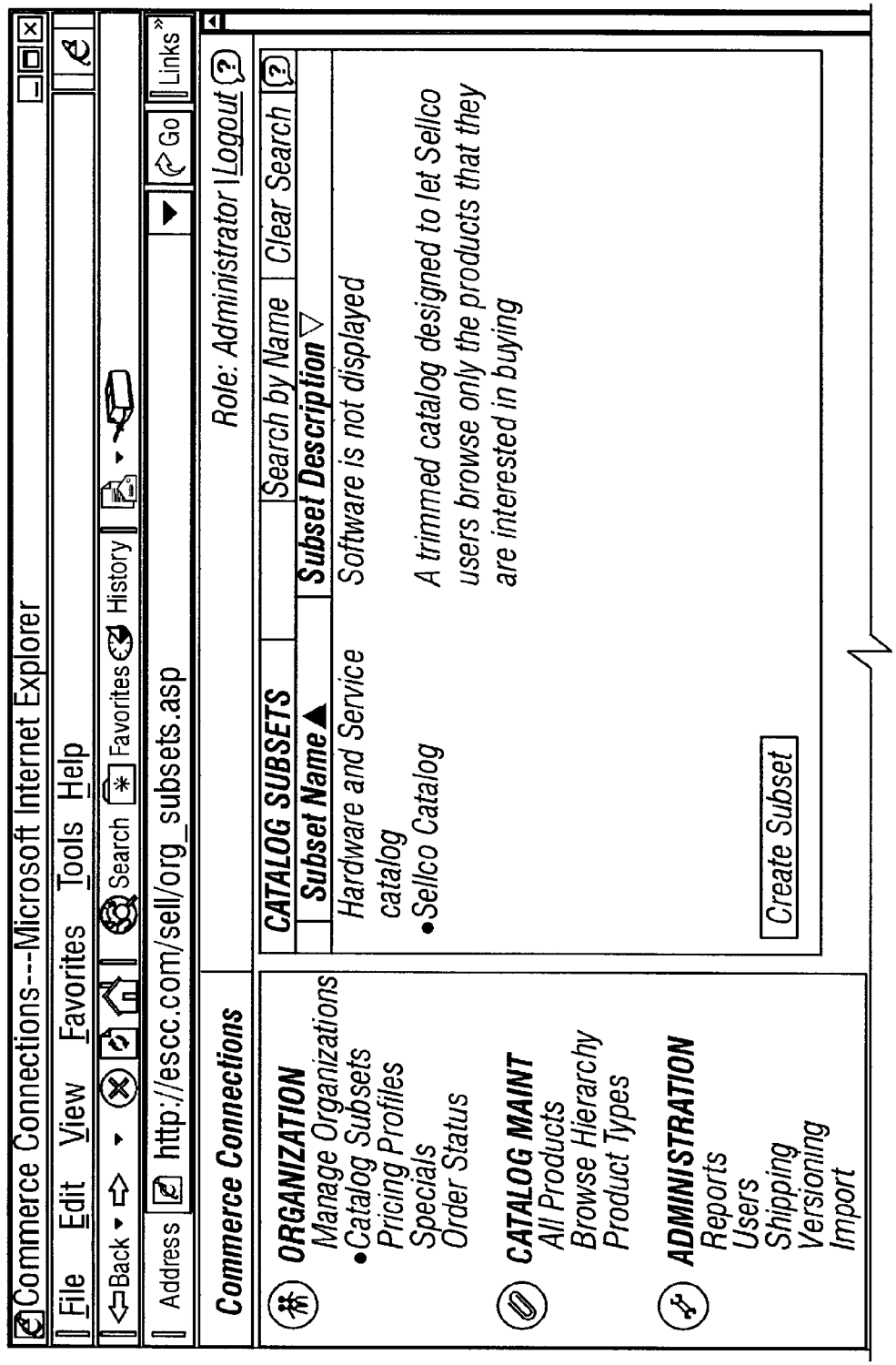
Figures 2, 4F:
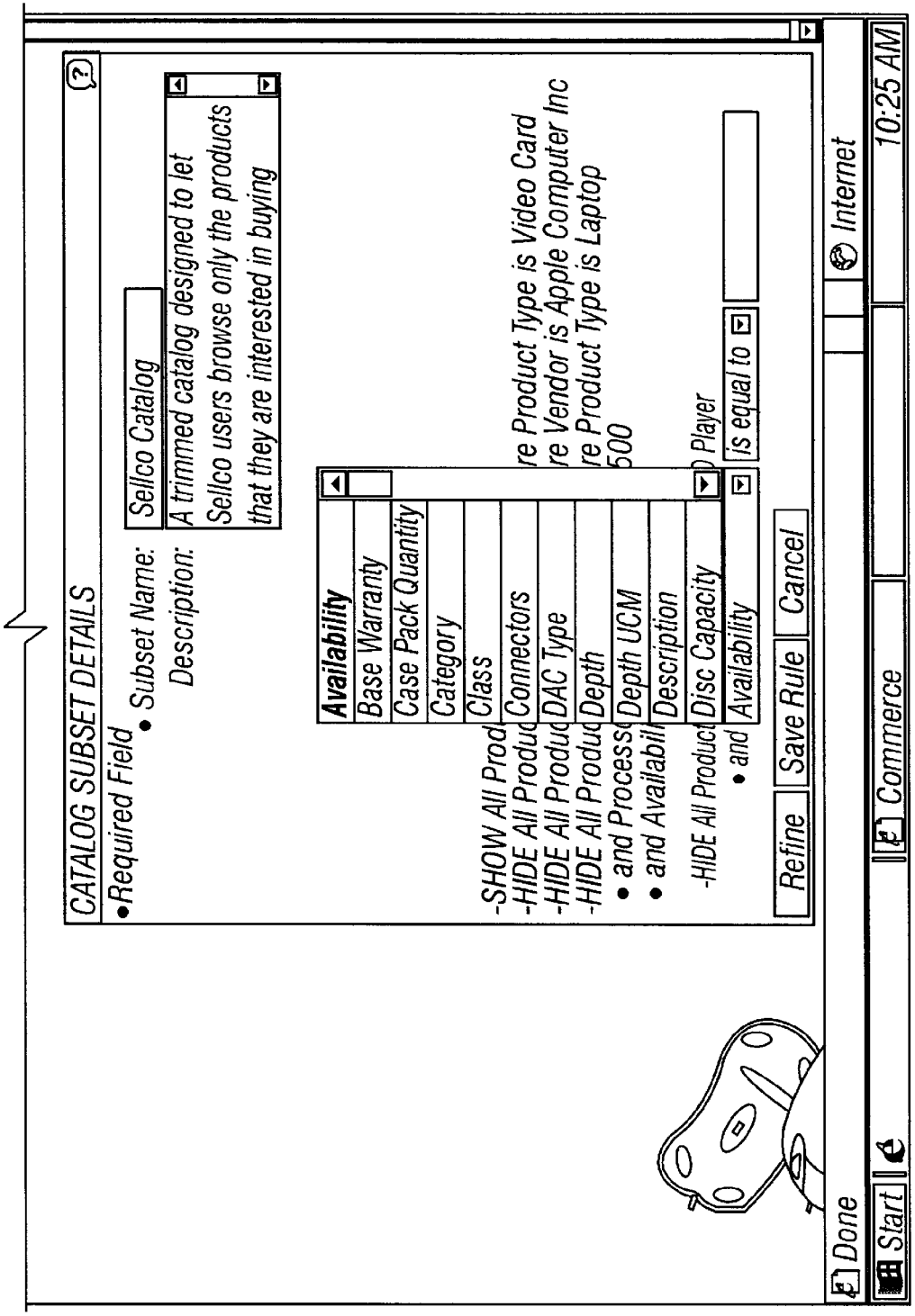
Figures 1, 4G:
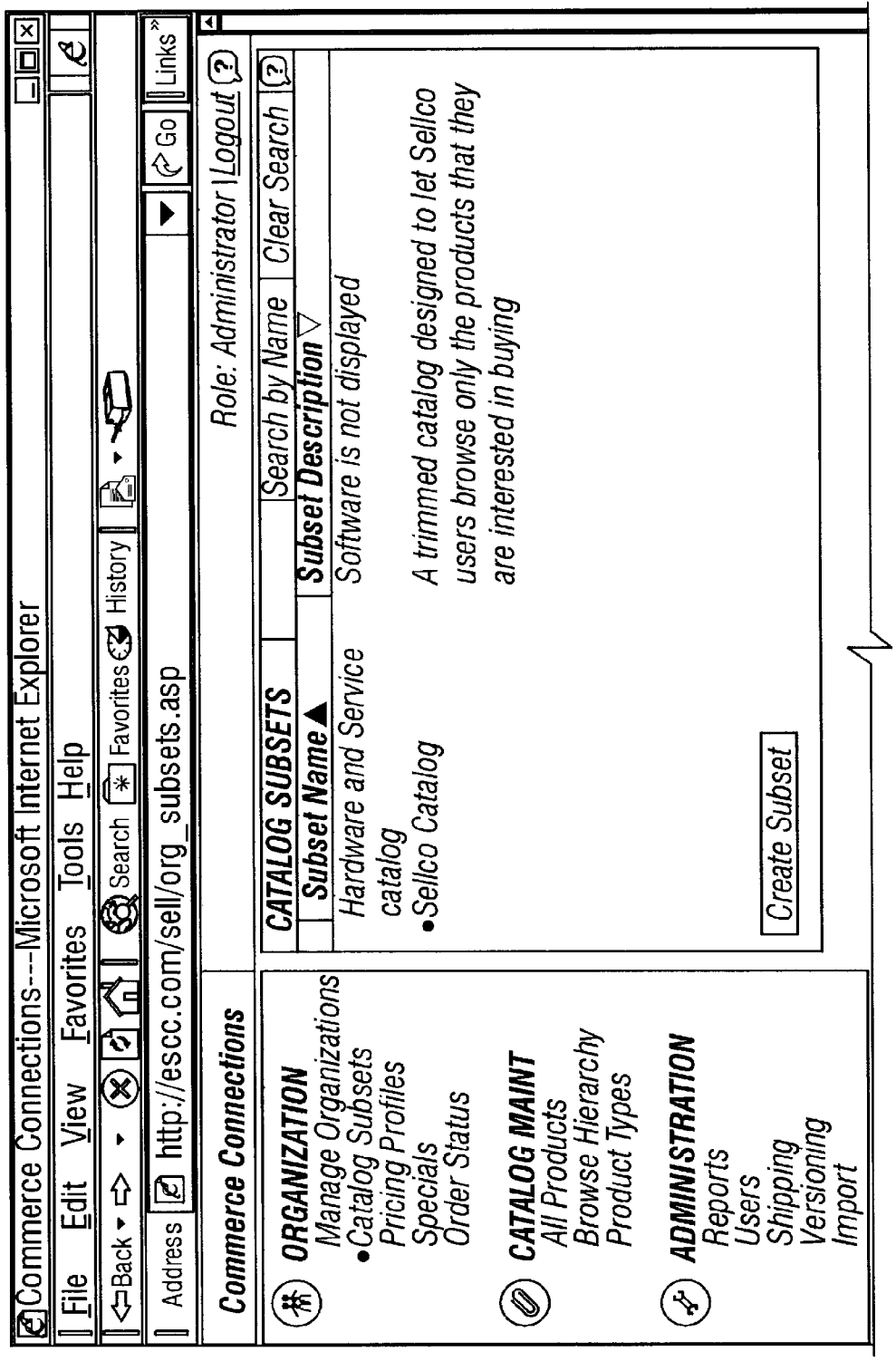
Figures 2, 4G:
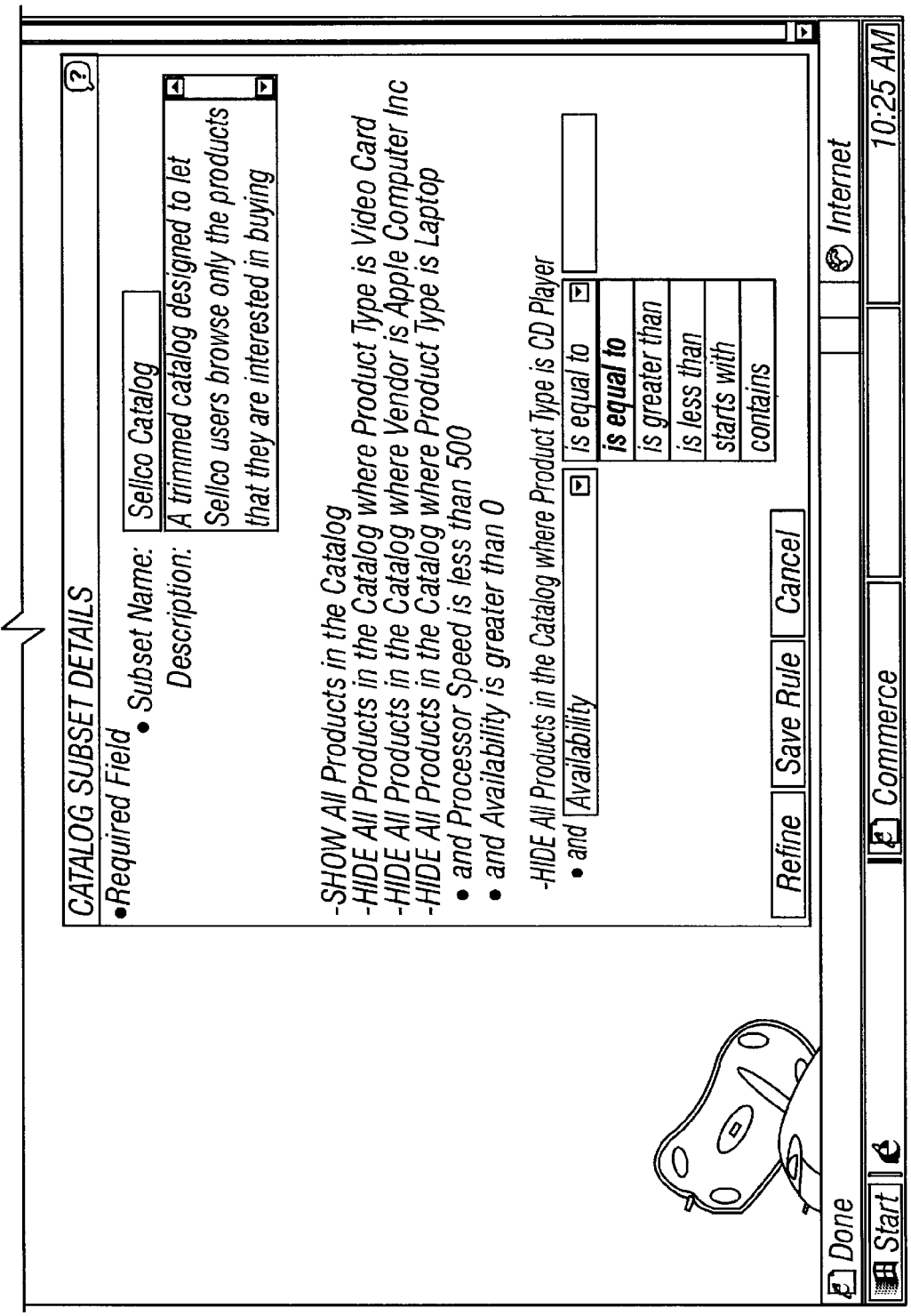
Figures 1, 4H:
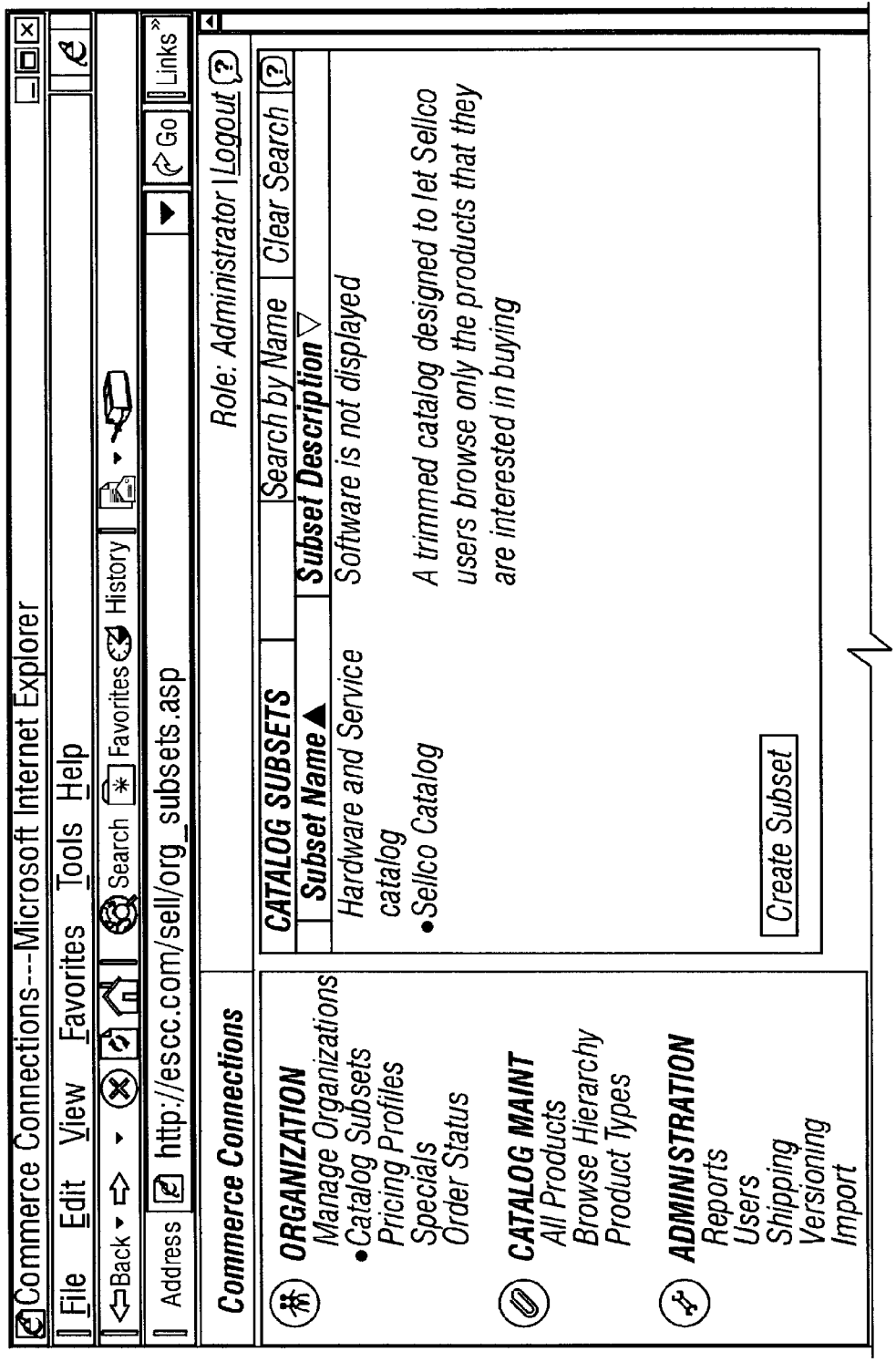
Figures 2, 4H:

FIGS. 4a–4h illustrate screen shots produced by one embodiment of the maintenance tool GUI on a seller-authorized user's web browser by which a rule set is developed for a fictitious extranet buyer or list of buyers called Sellco. The process is initiated by activating the "Create Subset" button as shown in FIG. 4a. In this case, FIG. 4a illustrates that a catalog subset has already been created for Sellco. By selecting Sellco and catalog subsets, the Sellco rule set is displayed in FIG. 4b. The terms "Show" and "Hide" are used interchangeably with the terms "Include" and "Exclude" as used hereinabove. To add to the rule set already created, the user selects the "Add Rule" button as shown on FIG. 4b. FIG. 4c shows the first option for creating the rule is to select between "Hide" and "Show" to create the next rule. FIG. 4d shows that "Hide" was selected, and now a product type is selected from the drop-down list box, from which "CD Player" is selected. FIG. 4e illustrates that a Vendor attribute can be optionally selected from the drop down list. FIG. 4f illustrates that upon activating (i.e. clicking on) the "Refine" button, additional attributes unique to the product type can also be selected from a drop down list. FIG. 4g illustrates that the "Availability" attribute has been chosen, and the attribute operator can be selected from a drop down list and a value inserted in the text box to the right of the operator. Finally, FIG. 4h illustrates that another buyer can be associated with a set of rules.

Figures 1, 5A:
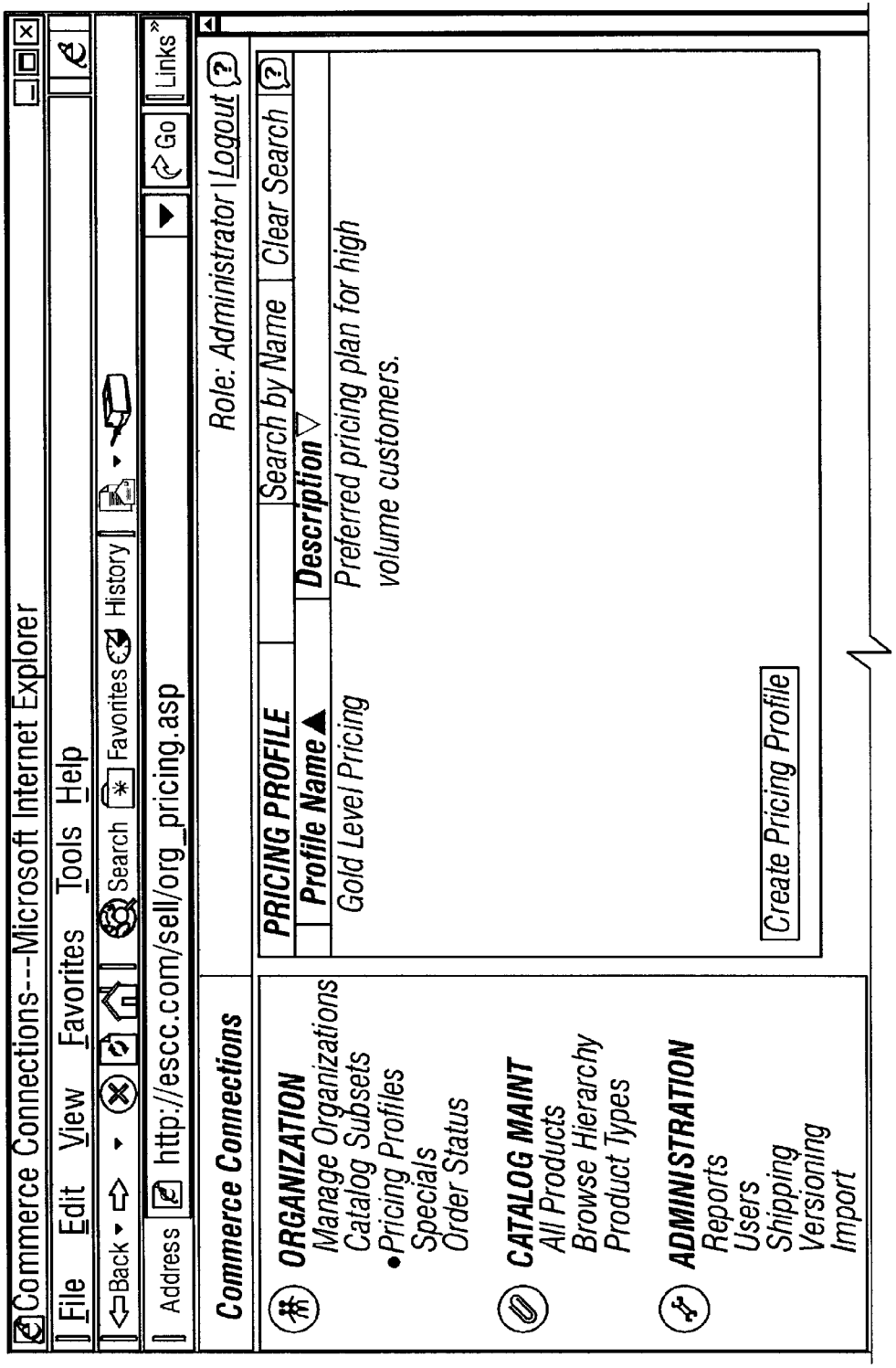
FIGS. 5a–5h are screen shots produced by one embodiment of the maintenance tool application GUI on a seller-authorized user's web browser by which a pricing profile is developed.
Figures 2, 5A:
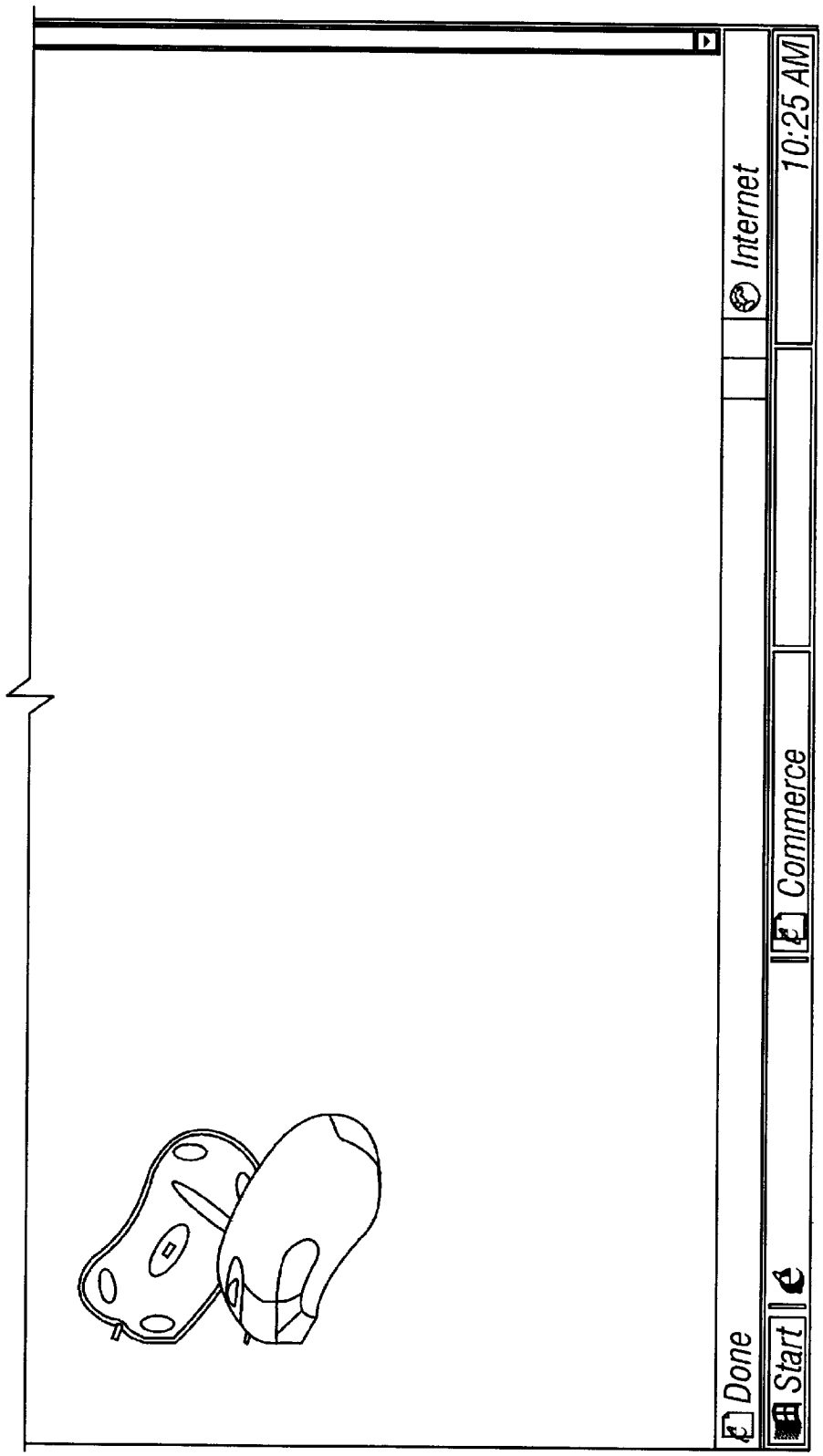
Figures 1, 5B:
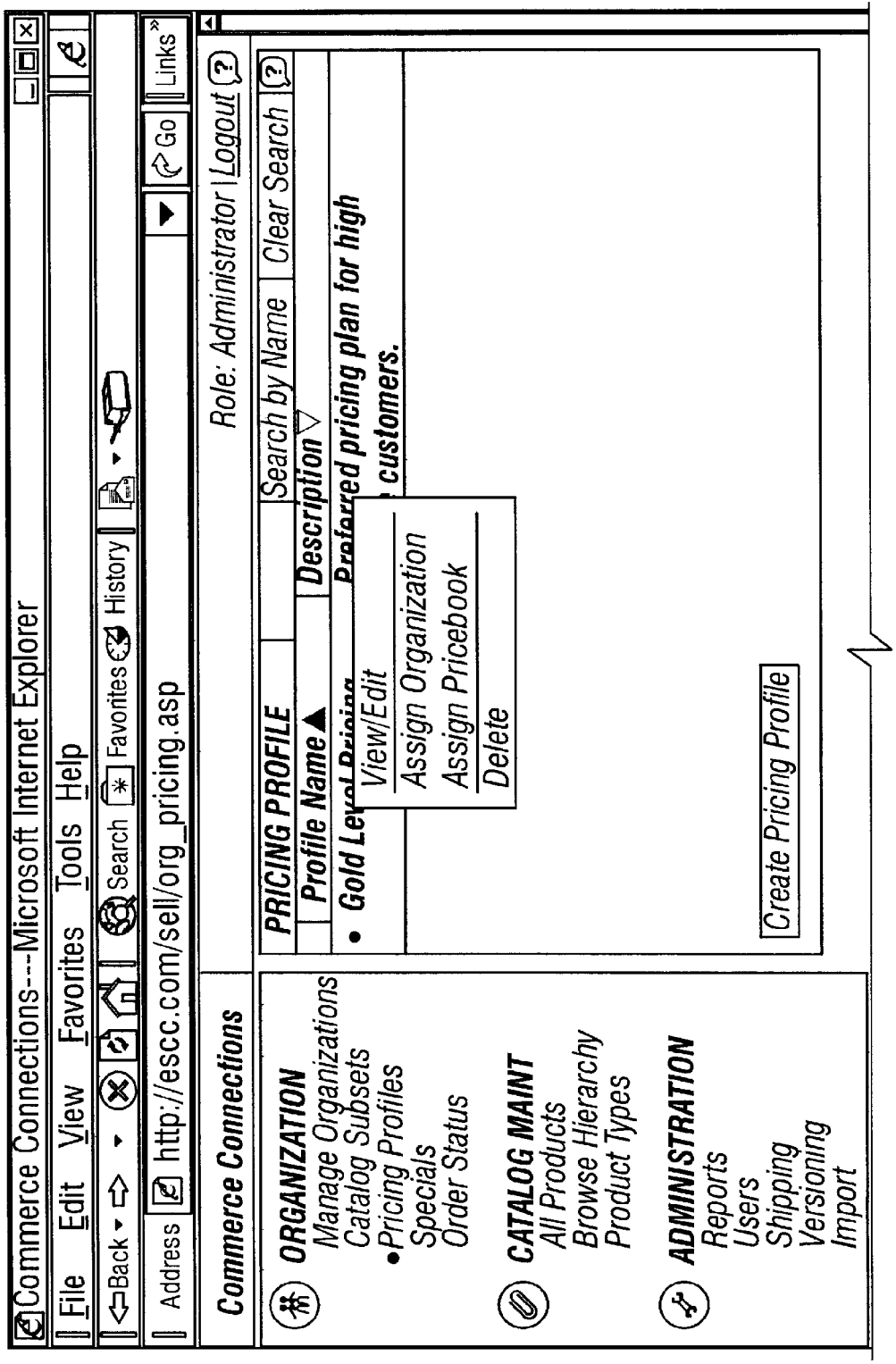
Figures 2, 5B:
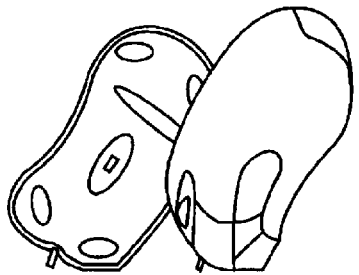
Figures 1, 5C:
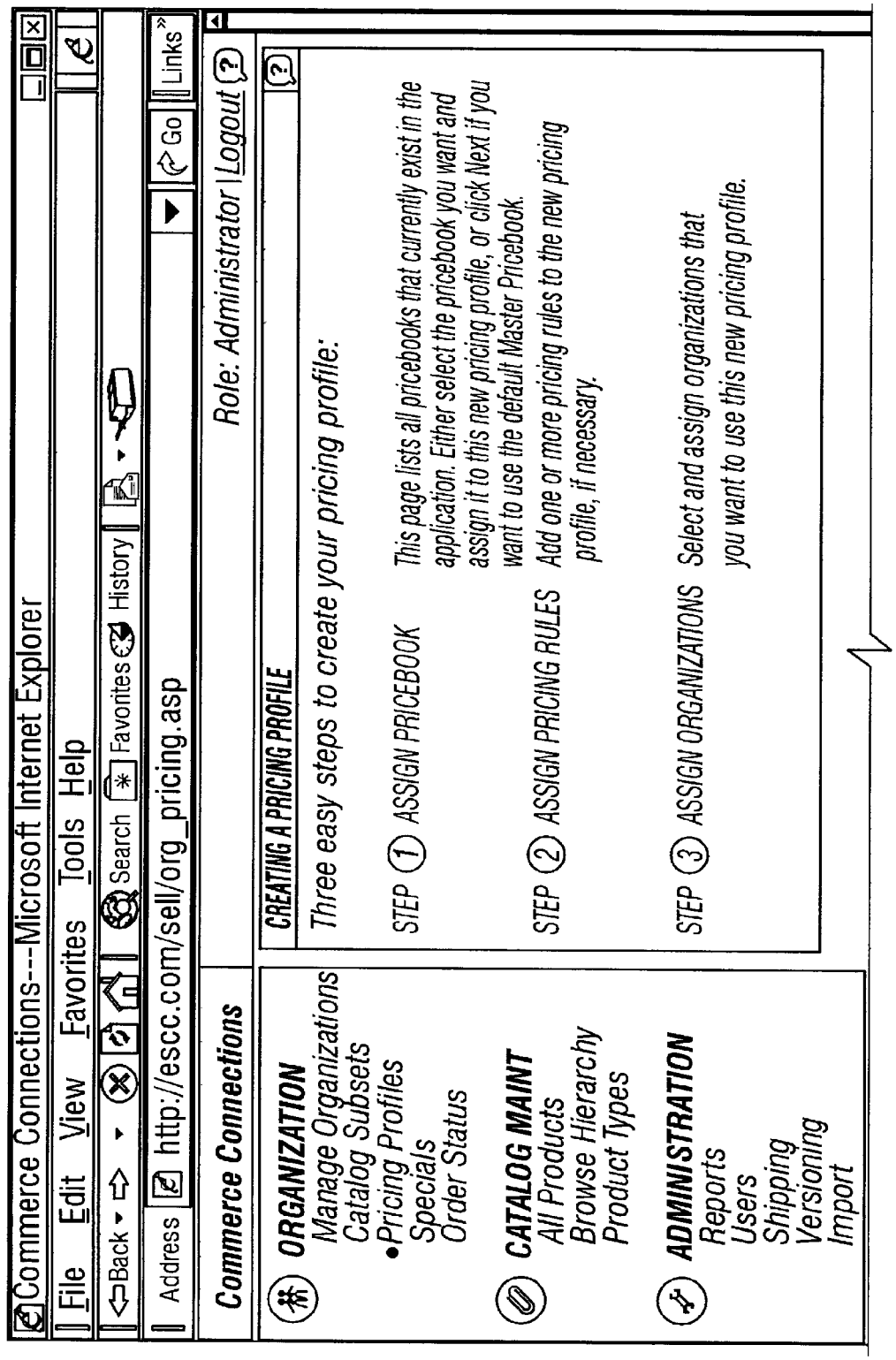
Figures 2, 5C:
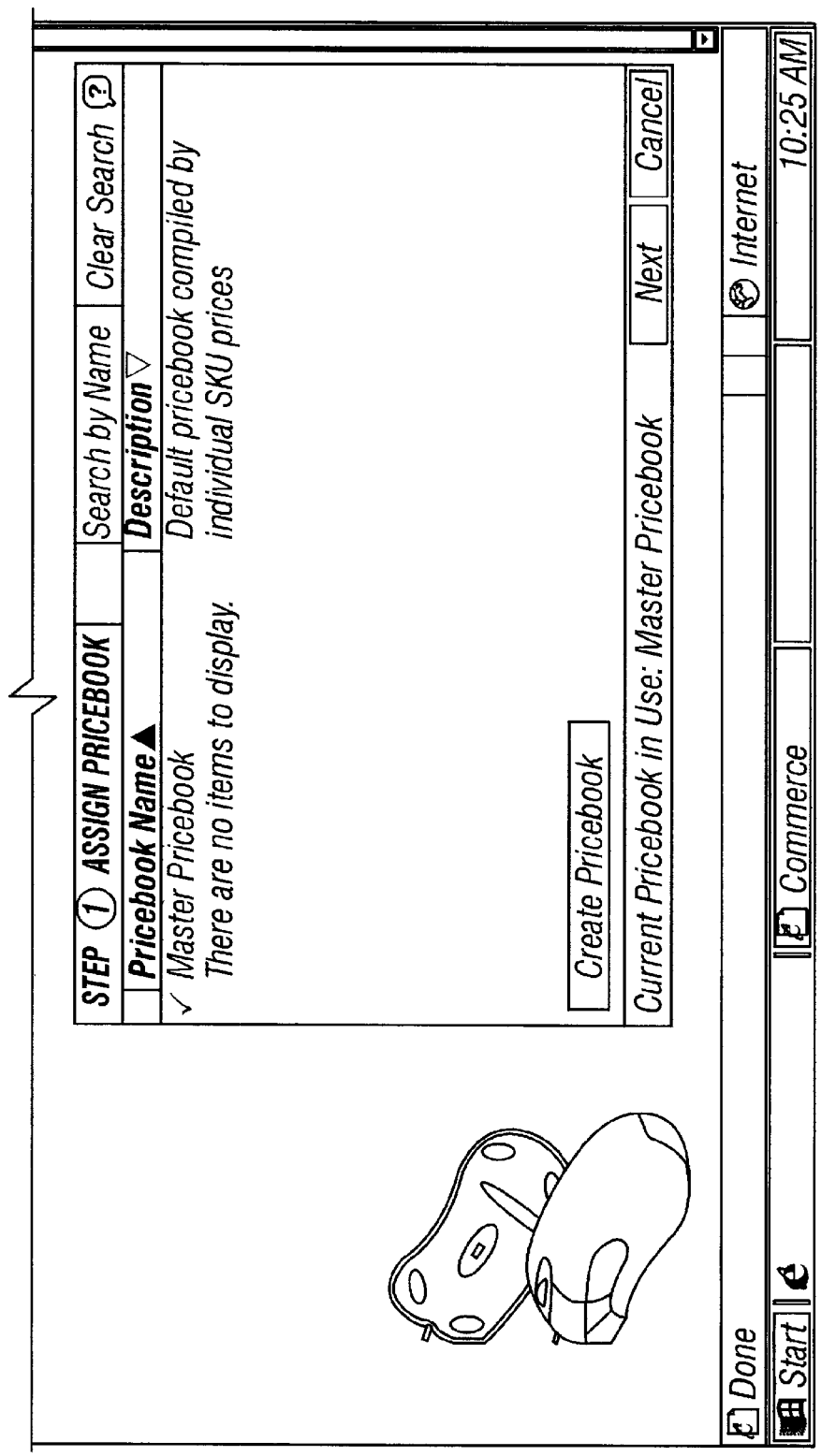
Figures 1, 5D:
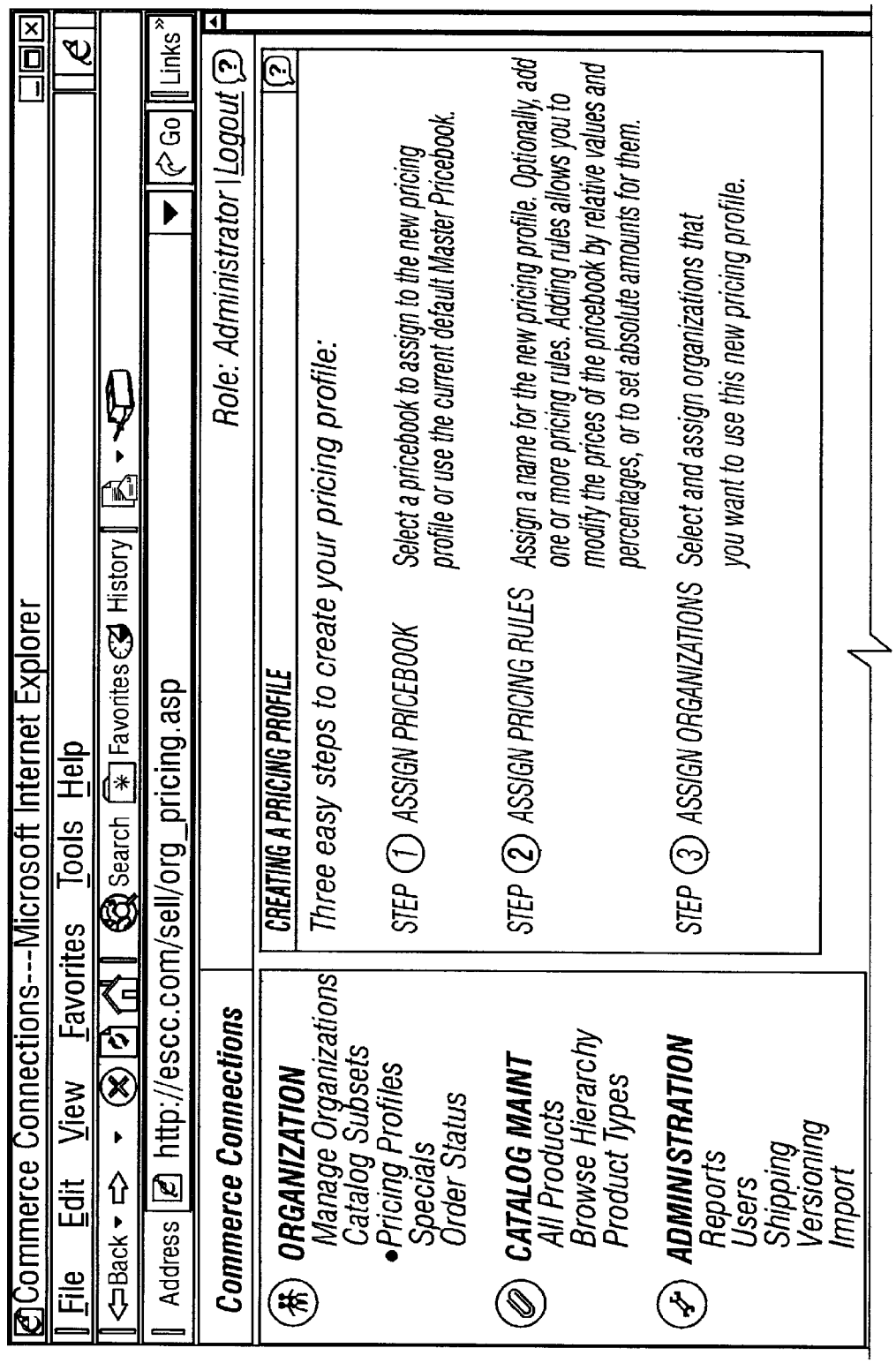
Figures 2, 5D:
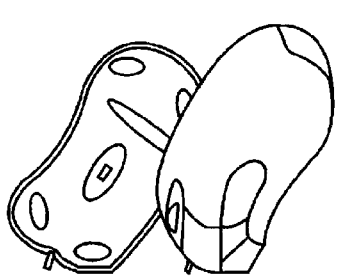
Figures 1, 5E:
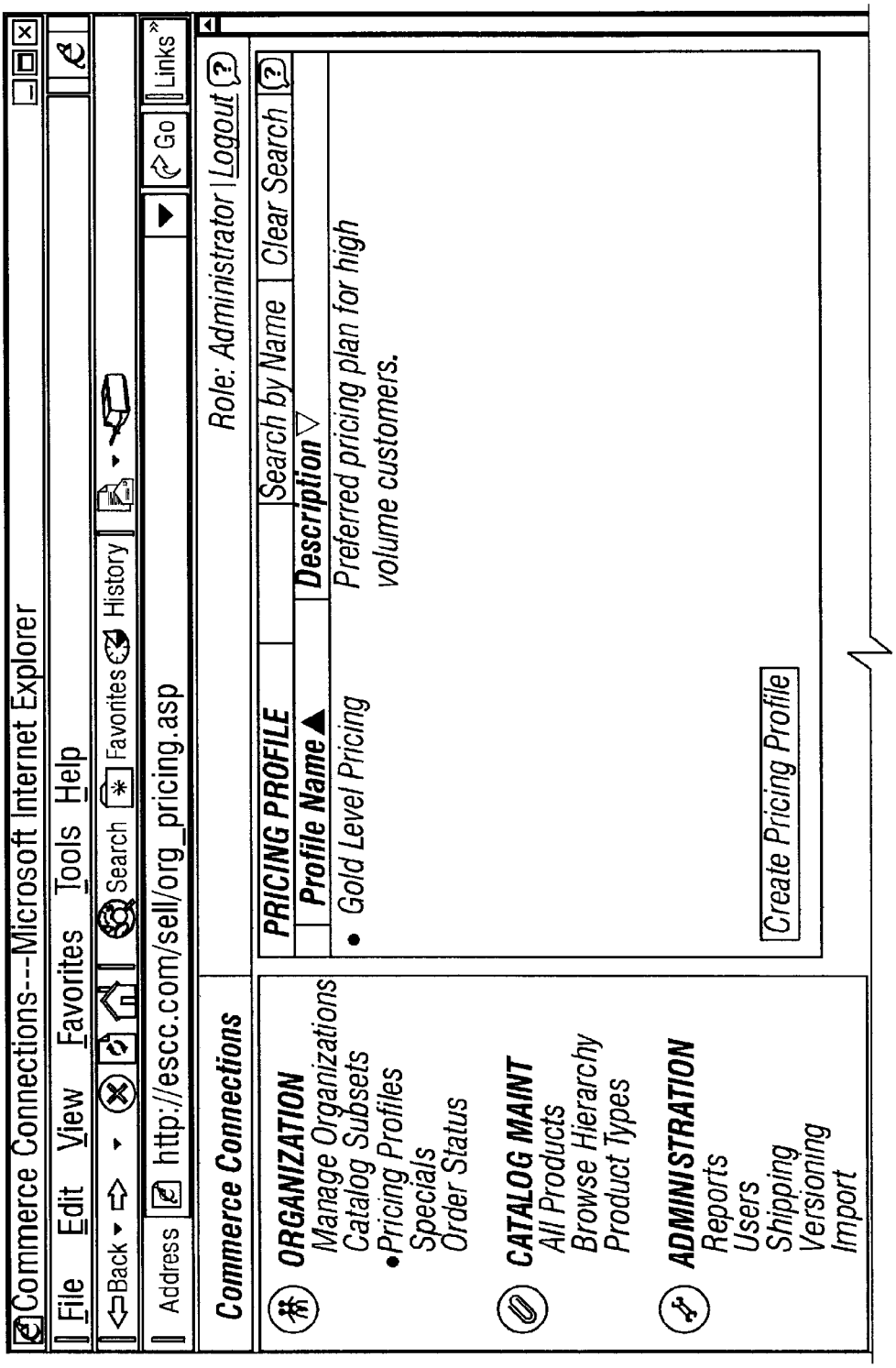
Figures 2, 5E:
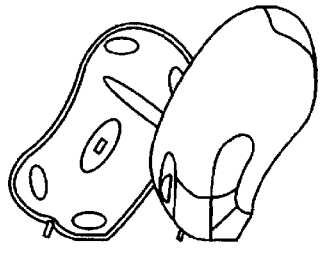
Figures 1, 5F:
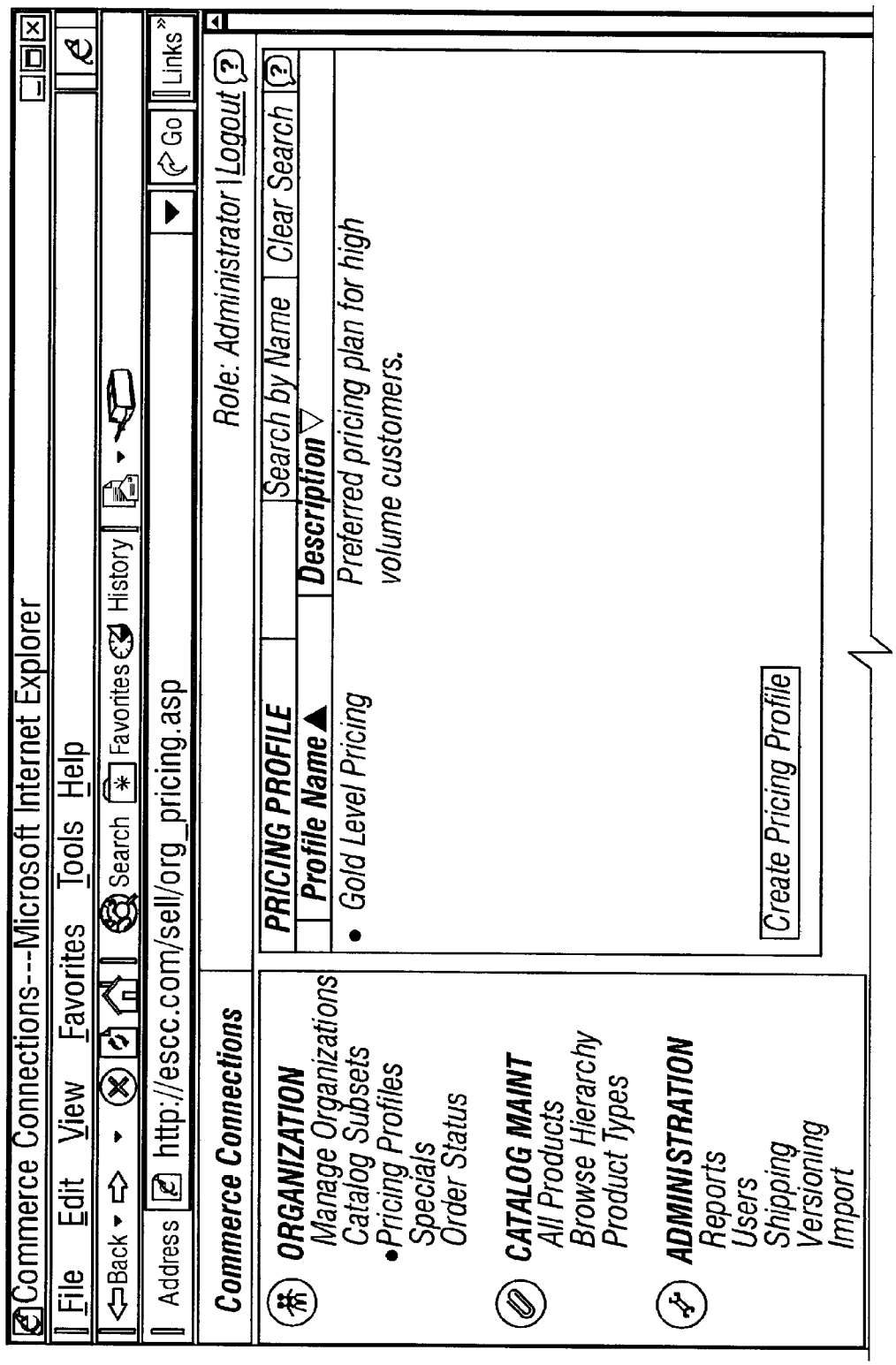
Figures 2, 5F:
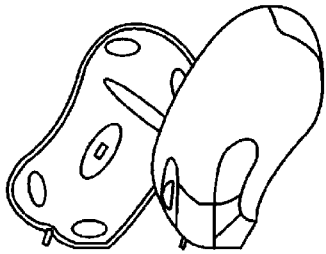
Figures 1, 5G:
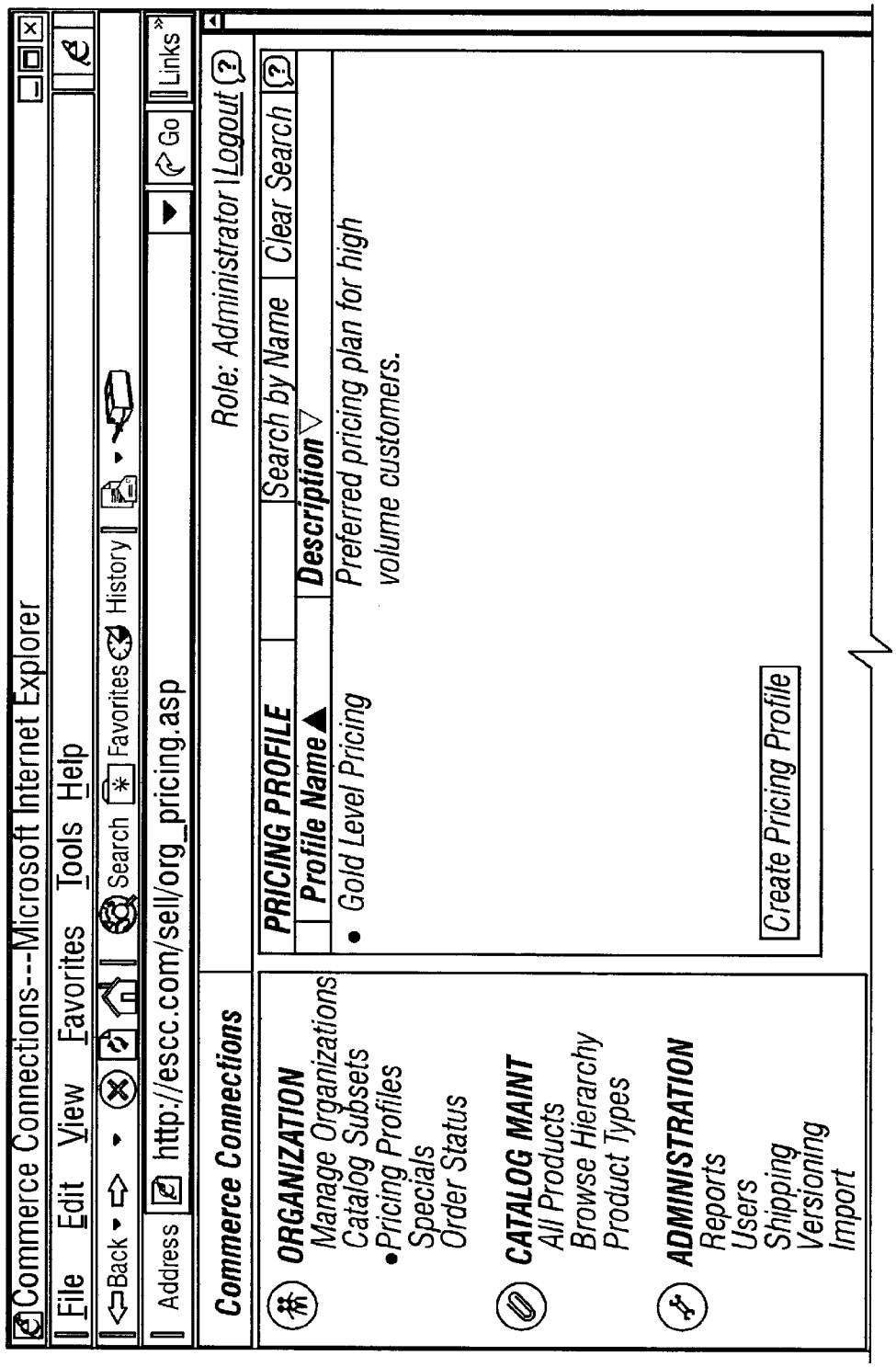
Figures 2, 5G:
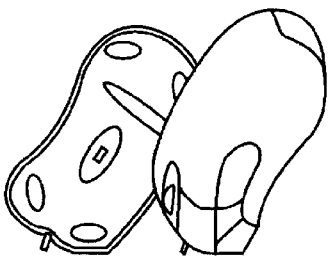
Figures 1, 5H:
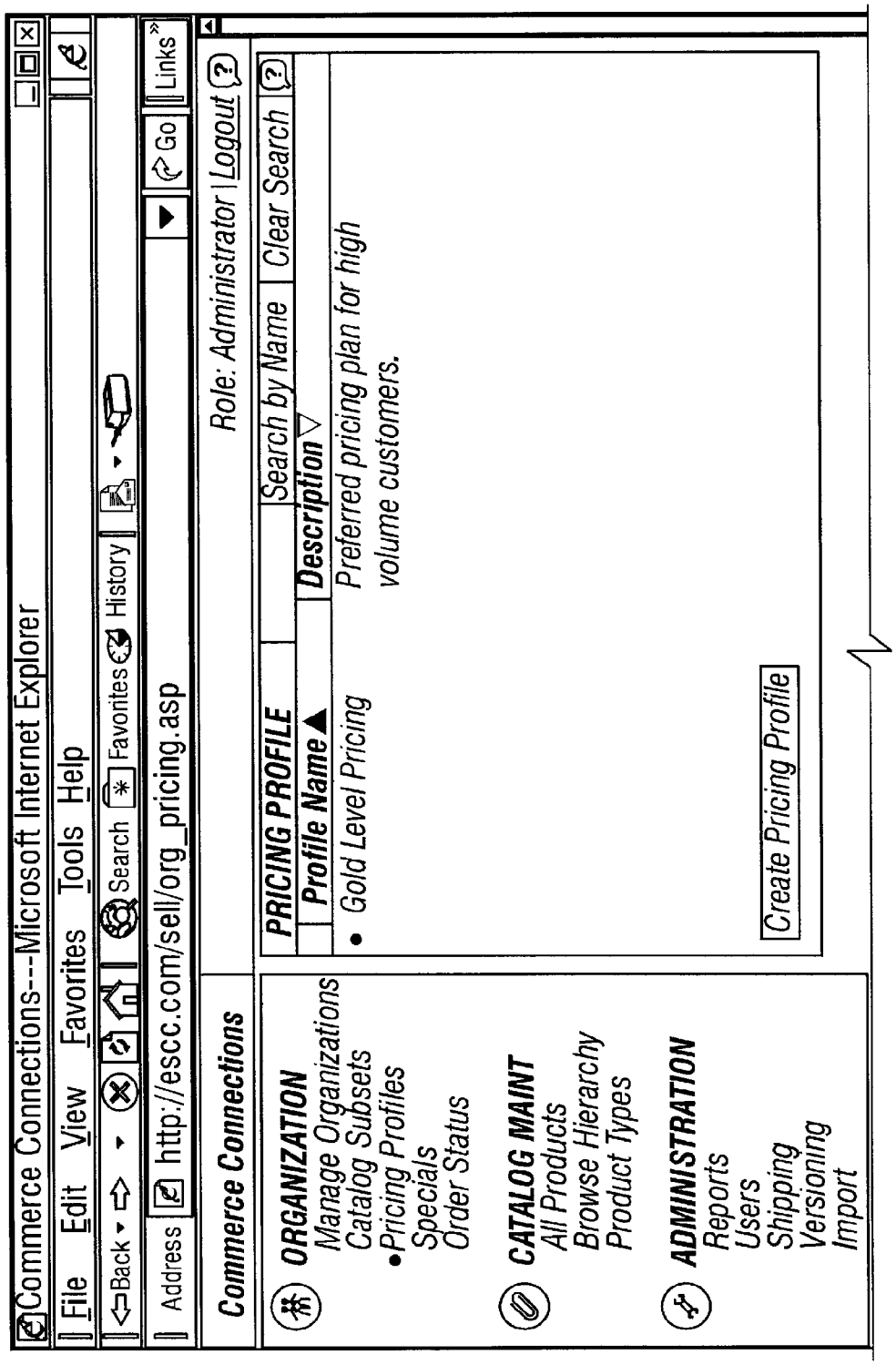
Figures 2, 5H:
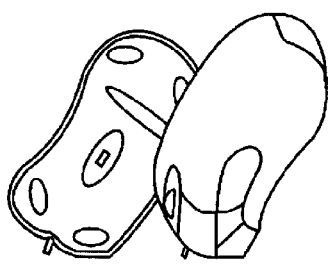

FIGS. 5a–5h are screen shots produced by one embodiment of the maintenance tool application GUI on a seller-authorized user's web browser by which a pricing profile is developed called "Silver Level Pricing." FIG. 5a shows that a user has selected Pricing Profiles, which indicates that there is already a pricing profile called "Gold Level Pricing" in existence. To edit existing profiles, FIG. 5b illustrates that the user can click on the existing profile name to perform functions such as to view and edit the profile, to assign it to a buyer (i.e. "organization"), to assign a price book or to delete the profile. To create a new pricing profile, the user clicks on the "Create Pricing Profile" button. FIG. 5c illustrates the screen after selecting the "Create Pricing Profile" button, which provides the procedure of one embodiment by which the pricing profile is created. The first step is to select a price book to apply to the profile. The choices are any that already exist, the master price book or the user can create a new price book for the profile and then assign it. FIG. 5d illustrates the fact that the master price book has been selected, and that the next step is to develop pricing rules for the pricing profile. The user clicks the "Add Rule" button to do so. FIG. 5e demonstrates the screen for assigning pricing rules. The drop down box lists the various attributes that can be selected for the rule. FIG. 5f shows that the selected attribute is "product type" and that an operator has been chosen to be "equals." FIG. 5f also demonstrates the list of choices shown in the drop-down box for the value of the "product type" attribute. FIG. 5g illustrates the choices for the adjustment type, with "increase by" being selected. Finally, FIG. 5h shows that the units for the adjustment type are USD (United States Dollars) or percentage. Also, a box is provided into which the adjustment amount is entered. FIG. 6 provides a sample listing for a price book that demonstrates the tab-delimited format used to represent the price book as stored.

Figure 7A:

FIGS. 7a–b are screen shots for one embodiment of the maintenance tool GUI that illustrate the process by which accounts are set up and managed for individual organizations. In FIG. 7a, a screen is illustrated that illustrates the "Manage Organization" process that when selected displays the lists of existing organizations, and a button for initiating the process of establishing a new account for a new organization. FIG. 7b is a screen shot that illustrates the screen provided by one embodiment of the maintenance tool upon selection of one of the existing organizations "Sellco." Organization details are displayed in the text boxes for Sellco, including the Pricing Profile to which Sellco is assigned having the identifier "Gold Level Pricing." Sellco is also assigned to a rule set for generating Sellco's custom catalog having the identifier "Sellco Catalog." Any of the information can be edited by simply typing over the text or making a new selection where appropriate.

Figure 8:
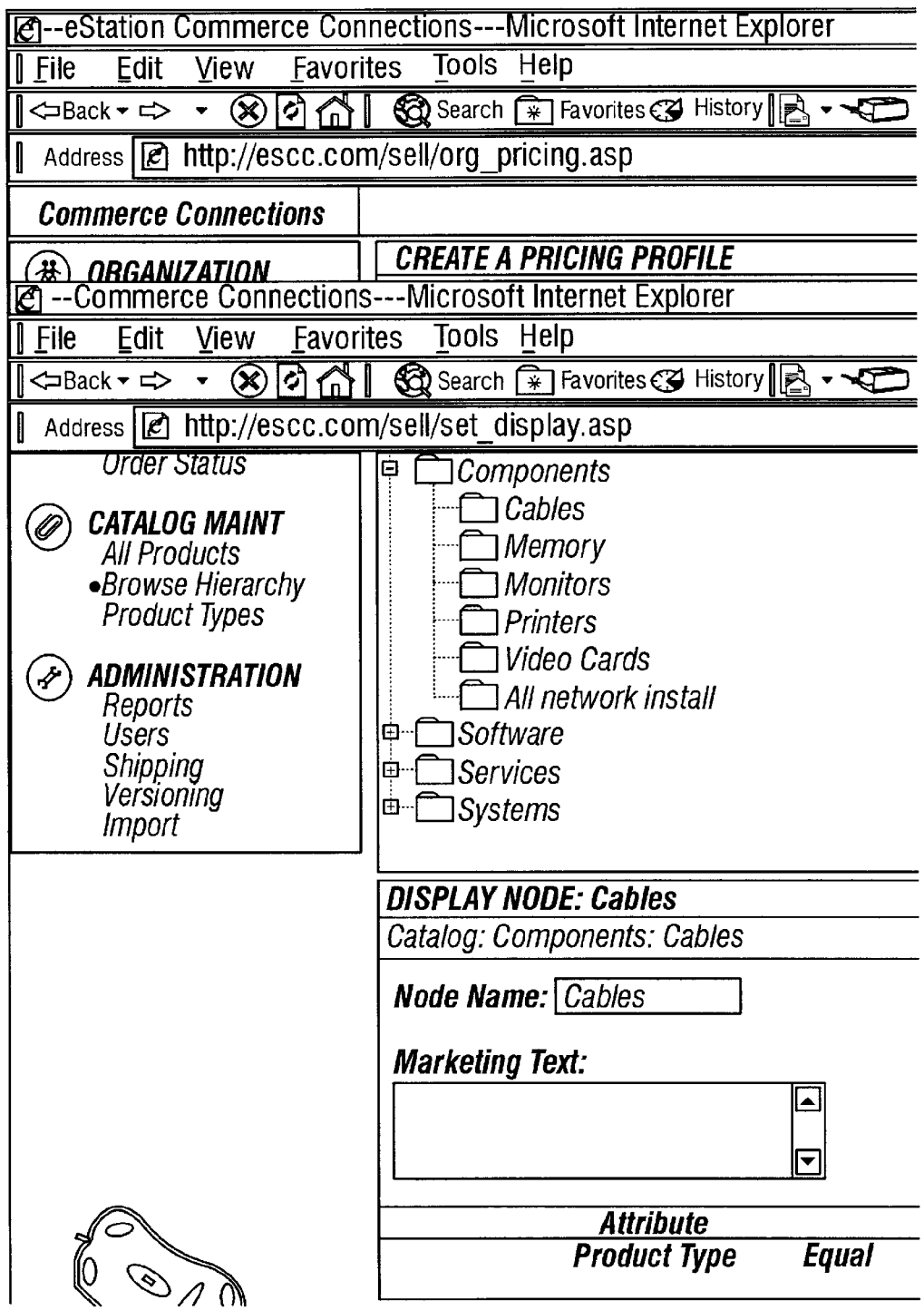
FIG. 8 is a screen shot for one embodiment of the maintenance tool GUI that illustrate the process by which a primary hierarchy is established using the maintenance tool.

FIG. 8 is a screen shot for one embodiment of the maintenance tool GUI that illustrate the process by which a primary hierarchy is established using the maintenance tool. The "Browse Hierarchy" link under Catalog Maintenance has been selected to display this screen of the GUI, and it displays a primary hierarchy in development. Node "Cables" has been selected under the parent node "Components" and the node name is displayed in the text box for node name. A text box for associated marketing text is provided by which the text will be displayed when a buyer selects the "Cables" node while browsing the seller's catalog using a custom browse hierarchy containing this node.

Moreover, one or more images can also be provided for display when the node is selected during browsing by specifying a URL for the location of the image(s). Constraints may be associated with this node by which to constrain those items in the catalog database that fall under this node, by selecting a product attribute and then specifying a value or range of values for that attribute. In this case, the attribute is simply "Product Type," the attribute is "cable" and the operator between the attribute and attribute value is "equals." Of course, any of these values can be edited by simply typing over them or making a new selection where appropriate.

Figures 1, 9A:
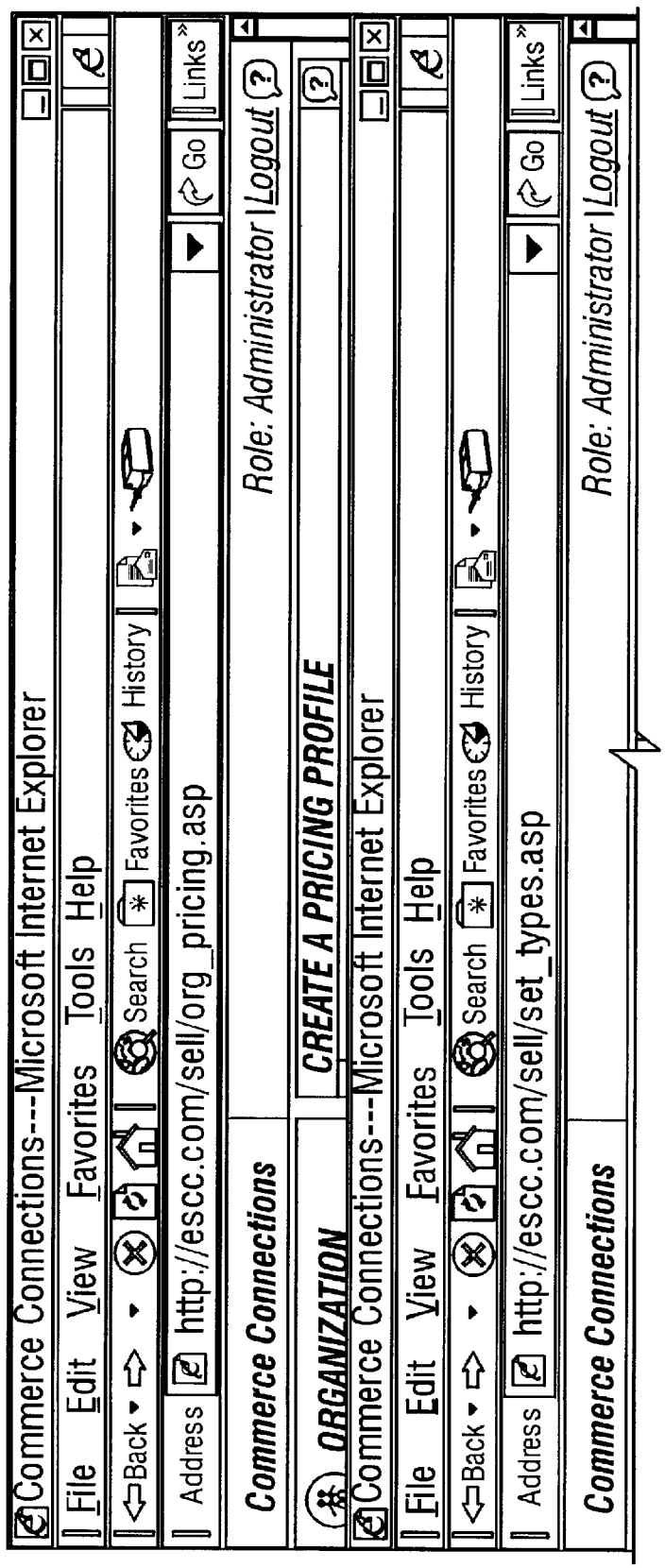
FIGS. 9a–c are screen shots for one embodiment of the maintenance tool GUI that illustrate the process by which data and metadata in the database are added, modified and maintained using the maintenance tool.
Figures 1, 9B:
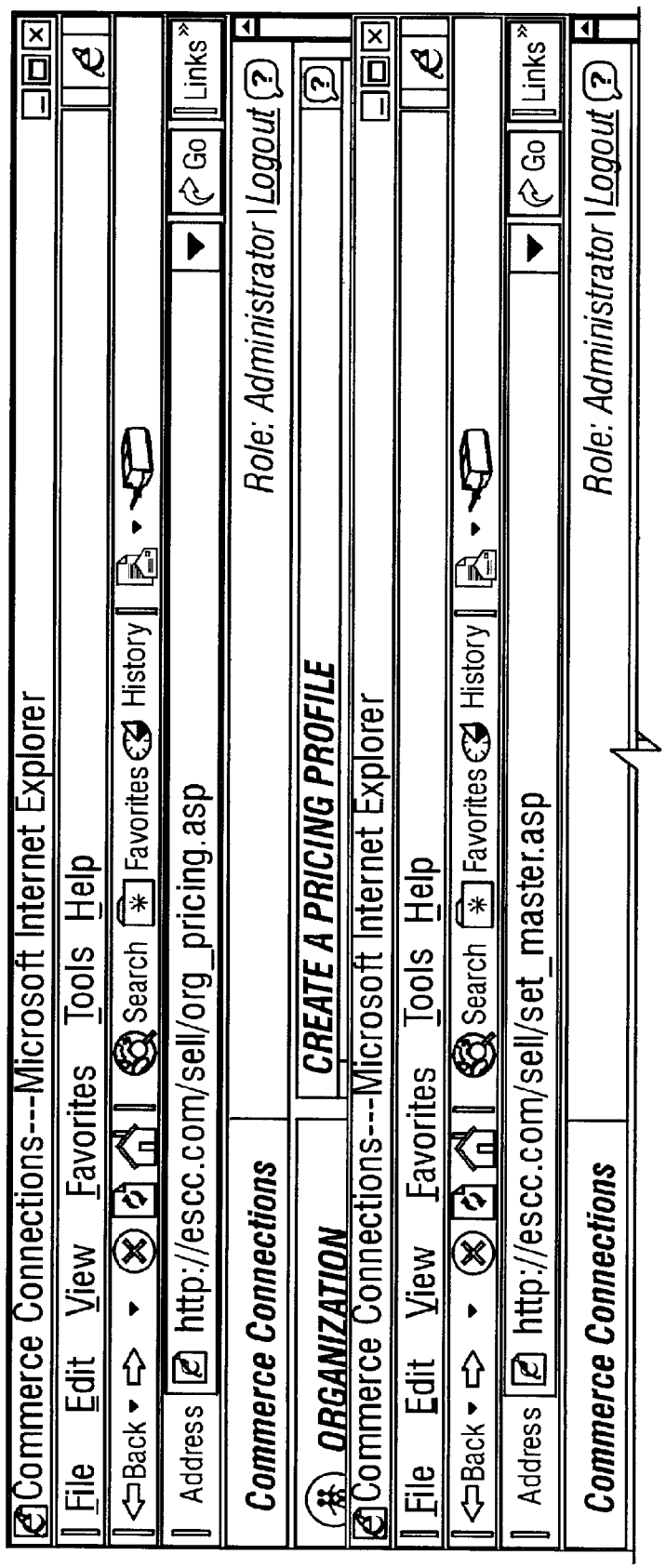
Figures 1, 9C:
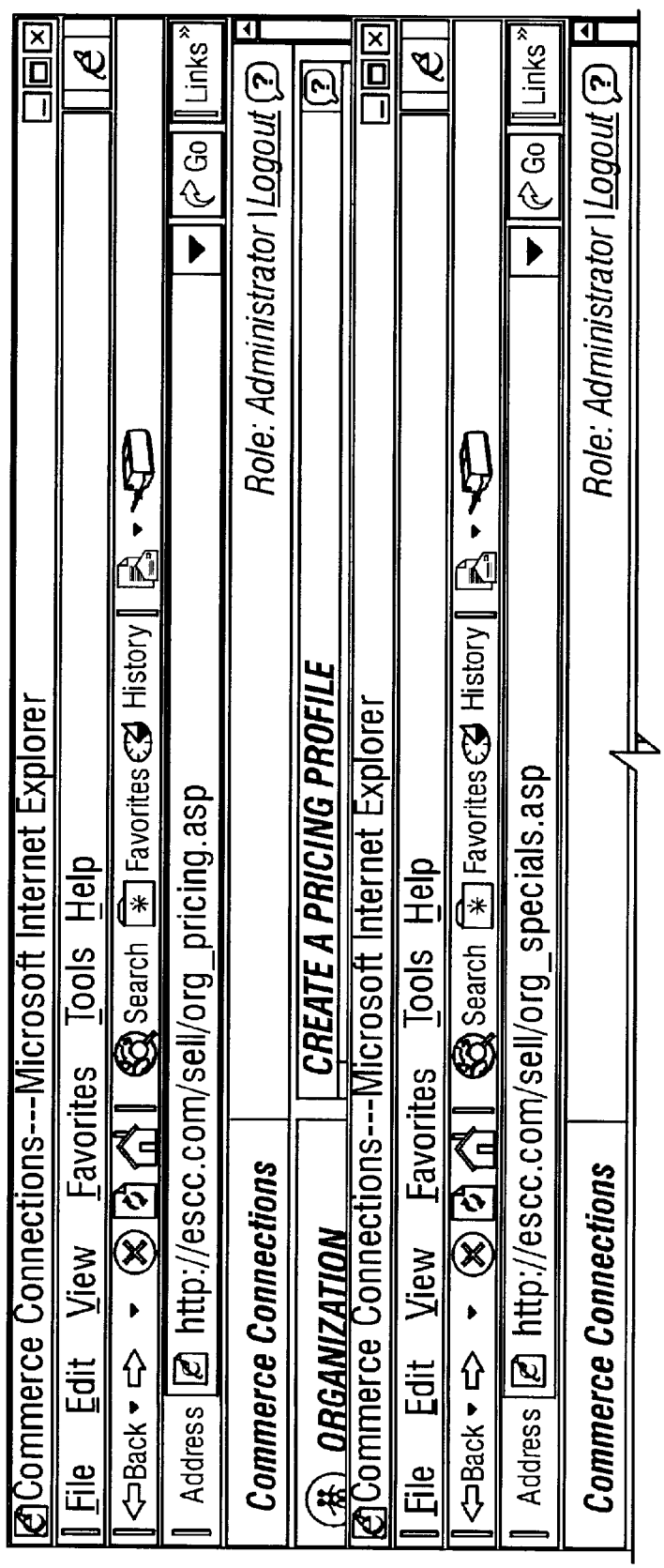

FIGS. 9a–c are screen shots for one embodiment of the maintenance tool GUI that illustrate the process by which data and metadata in the database are added, modified and maintained using the maintenance tool. FIG. 9a illustrates that the "Product Types" link under Catalog Maintenance has been selected to display this screen of the GUI, and it displays a list of the existing product types already defined by the maintenance tool. Product type "Battery" has been selected. Also illustrated in FIG. 9a is that the detailed attributes characterizing the Battery product type are listed and established using the Product Type Details section. The attributes are given names using the "Attribute" text box, a check box is provided to indicate whether they are to be globally searched and whether the attribute can have multiple values. A list box is provided for each attribute by which the type of attribute value is specified (e.g. integer, string, float, etc.). FIG. 9b illustrates the process by which items are entered into the database. In a first step (not shown) the item is given a name, vendor is specified, a SKU number is assigned and a product type is assigned. In the second step (shown), the values for the attributes falling under the assigned product type are filled in using the text boxes. In FIG. 9c, a screen shot for one embodiment of the maintenance tool GUI is shown that illustrates the process by which specials may be established on certain products, including marketing text, images, prices and the organizations that are permitted to see the specials.

FIG. 10 provides a sample listing of a file format by which information for a catalog item can be imported into the catalog database using one embodiment of the maintenance tool.

Those of skill in the art will recognize that regardless of whether the database, rule sets, pricing profile and primary hierarchy are maintained using the maintenance over extranets or locally, and regradless of whether the custom catalogs, browse hierarchies and pricing information are to be provided to buyers through a network connection or through exportation, the maintenance tool makes it significantly easier on the seller to provide and maintain custom catalogs with custom pricing for its various buyers through centrally maintained single-source data. The seller need only create and maintain catalog databases in one physical location that represent some or all available goods/services offered by the seller. The seller further need only maintain custom catalog rule sets and rule-based pricing profiles, one to which each buyer or buyer organization is assigned, from which updated custom catalogs and custom pricing adjustments for items identified in the database can be generated. And to provide custom hierarchies, the scope of which are substantially coextensive with the scope of the custom catalogs, the Seller need only maintain a single primary hierarchy the scope of which is substantially coextensive with the catalog database. If the database, the catalog rule sets, the profiles or the primary hierarchy are modified using the maintenance tool, the seller need only re-evaluate the rule sets, the pricing profiles and the custom browse hierarchies by initiating the publication process to reflect any modifications thereto.

The above embodiments illustrate but do not limit the invention. In particular, the invention is neither limited by the types of computers used as servers, nor the operating systems, web server or database server application software run on such servers. The invention is not limited to implementation within extranets or other Internet applications, but may be implemented over private networks exploring proprietary display and transmission formats. The invention is limited neither by the types of user terminals used to connect to the servers, nor the type of browser software resident on the terminals. The invention is neither limited by the structure of the data as stored in the database, nor is it limited by the nomenclature used in identifying data types and attributes. The invention is not limited to operate over the Internet, as private networks employing proprietary transmission and display formats may be substituted without exceeding the cope of the invention. Moreover, the invention is not limited by the characteristics of the GUI embodiments disclosed herein.

In addition, while the invention is illustrated in the disclosed embodiments as providing a maintenance tool for a seller to centrally maintain a single source of data to provide custom catalogs, custom pricing for catalog items, and custom browse hierarchies for individual buyers and buyer groups, those of ordinary skill in the art will recognized that it may also be used, for example, by a large buyer maintaining and providing a catalog for a database of desired requisition items. A number of suppliers could be authorized to respond to some subset of such requests by the buyer, and the invention could be used to customize the pricing the buyer is willing to pay particular suppliers responding to such requisition items (e.g. requests for materials or services).

Finally, many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries. Other embodiments and variations are within the scope of the invention, as defined by the appended claims. Other embodiments and variations are within the scope of the invention, as defined by the appended claims.

What is claimed is:

1. A method of maintaining data in a database representative of a plurality of catalog items, said method comprising:

publishing the data as a plurality of custom catalogs each comprising a unique subset of the catalog items in the database, each of the custom catalogs assigned to one or more organizations;

modifying the data in the database without affecting the published data;

republishing the data to incorporate the modifications made to the data in the database into the custom catalogs; and establishing a plurality of rule sets, each of the rule sets specifying constraints defining a scope of the items contained in one of the custom catalogs, wherein the constraints identify items in the database based on at least attributes and attribute values of the items.

2. The method of claim 1 further comprising importing data into the database from one or more external sources and storing the data in a format that facilitates maintenance of the data.

3. The method of claim 2 wherein:

each item is represented by the data as having an item identifier, a product type, one or more attributes and one or more values for each of the attributes; and the data representing each item is organized in the database as having an entry for each of the one or more attribute values.

4. The method of claim 3 wherein:

said publishing further comprises converting the data into a read only copy of the data into a format that facilitates searching; and wherein the format that facilitates searching comprises organizing the items into groups by product type, each of the groups having one entry per item identifier.

5. The method of claim 2 wherein said publishing further comprises converting the data from the format facilitating maintenance of the data to a format that facilitates searching the data.

6. The method of claim 5 wherein said converting the data comprises creating a copy of the converted data.

7. The method of claim 1 wherein said publishing and said republishing further comprise locking the database to inhibit said modifying until said publishing and said republishing are completed.

8. The method of claim 7 wherein said modifying and said republishing are performed routinely.

9. The method of claim 1 wherein each of the rule sets are specific to one of the organizations.

10. The method of claim 9 wherein said publishing and said republishing comprise searching the database and returning a set of item identifiers for each of the rule sets that meet the constraints specified by each rule set.

11. The method of claim 1 wherein each of the rule sets is associated with a unique identifier, and each wherein each of the one or more organizations is assigned to a custom catalog by the rule set identifier of the rule set defining the scope of items in the custom catalog.

12. The method of claim 1 further comprising:

establishing a primary hierarchy representative of the catalog items in the database using attributes and attribute values of the items; and generating a browse hierarchy for each of the custom catalogs using attributes and attribute values of the items, wherein each browse hierarchy is associated with one or more customer catalogs, is based on the primary hierarchy, and is representative of the subset of items included within the custom catalog associated with the browse hierarchy.

13. The method of claim 1 further comprising establishing pricing profiles for one or more of the organizations, each of the pricing profiles defining none, one or more adjustments to base prices ascribed to each of the catalog items in the database.

14. The method of claim 13 wherein each of the pricing profiles specifies one or more constraint-based rules by which to identify the scope of items in the database for which each of the none, one or more pricing adjustments is to be applied.

15. The method of claim 14 wherein said publishing and said republishing further comprise searching the database and returning a set of item identifiers for each of the specified adjustments of each of the pricing profiles.

16. An apparatus for maintaining data in a database representative of a plurality of catalog items, said apparatus comprising:

means for publishing the data as a plurality of custom catalogs each comprising a unique subset of the catalog items in the database, each of the custom catalogs assigned to one or more organizations;

means for modifying the data in the database without affecting the published data;

means for republishing the data to incorporate the modifications made to the data in the database into the custom catalogs; and means for establishing a plurality of rule sets, each of the rule sets specifying constraints defining a scope of the items contained in one of the custom catalogs, wherein the constraints identify items in the database based on at least attributes and attribute values of the items.

17. The apparatus of claim 16 further comprising means for importing data into the database from one or more external sources and storing the data in a format that facilitates maintenance of the data.

18. The apparatus of claim 17 wherein:

each item is represented by the data as having an item identifier, a product type, one or more attributes and one or more values for each of the attributes; and the data representing each item is organized in the database as having an entry for each of the one or more attribute values.

19. The apparatus of claim 18 wherein:

said means for publishing further comprises means for converting the data into a read only copy of the data into a format that facilitates searching; and wherein the format that facilitates searching comprises organizing the items into groups by product type, each of the groups having one entry per item identifier.

20. The apparatus of claim 17 wherein said means for publishing further comprises means for converting the data from the format facilitating maintenance of the data to a format that facilitates searching the data.

21. The apparatus of claim 20 wherein said means for converting the data comprises means for creating a copy of the converted data.

22. The apparatus of claim 16 wherein said means for publishing and said means for republishing further comprise means for locking the database to inhibit said means for modifying until said means for publishing and said means for republishing have published and republished the data respectively.

23. The apparatus of claim 22 wherein said means for modifying and said means for republishing are performed routinely.

24. The apparatus of claim 16 wherein each of the rule sets are specific to one of the organizations.

25. The apparatus of claim 24 wherein said means for publishing and said means for republishing comprise means for searching the database and returning a set of item identifiers for each of the rule sets that meet the constraints specified by each rule set.

26. The apparatus of claim 16 wherein each of the rule sets is associated with a unique identifier, and each wherein each of the one or more organizations is assigned to a custom catalog by the rule set identifier of the rule set defining the scope of items in the custom catalog.

27. The apparatus of claim 16 further comprising:

means for establishing a primary hierarchy representative of the catalog items in the database; and means for generating a browse hierarchy for each of the custom catalogs, wherein each browse hierarchy is associated with one or more customer catalogs, is based on the primary hierarchy, and is representative of the subset of items included within the custom catalog associated with the browse hierarchy.

28. The apparatus of claim 16 further comprising means for establishing pricing profiles for one or more of the organizations, each of the pricing profiles defining none, one or more adjustments to base prices ascribed to each of the catalog items in the database.

29. The apparatus of claim 28 wherein each of the pricing profiles specifies one or more constraint-based rules by which to identify the scope of items in the database for which each of the none, one or more pricing adjustments is to be applied.

30. The apparatus of claim 29 wherein said means for publishing and said means for republishing further comprise means for searching the database and returning a set of item identifiers for each of the specified adjustments of each of the pricing profiles.

31. A computer program product for maintaining data in a database representative of a plurality of catalog items, said computer program product comprising:

a computer readable storage medium and program instructions stored on said storage medium for:

publishing the data as a plurality of custom catalogs each comprising a unique subset of the catalog items in the database, each of the custom catalogs assigned to one or more organizations;

modifying the data in the database without affecting the published data;

republishing the data to incorporate the modifications made to the data in the database into the custom catalogs; and establishing a plurality of rule sets, each of the rule sets specifying constraints defining a scope of the items contained in one of the custom catalogs, wherein the constraints identify items in the database based on at least attributes and attribute values of the items.

32. The computer program product of claim 31 wherein said computer program instructions are further for importing data into the database from one or more external sources and storing the data in a format that facilitates maintenance of the data.

33. The computer program of claim 32 wherein:

each item is represented by the data as having an item identifier, a product type, one or more attributes and one or more values for each of the attributes; and the data representing each item is organized in the database as having an entry for each of the one or more attribute values.

34. The computer program product of claim 33 wherein:

said computer program instructions are further for converting the data into a read only copy of the data into a format that facilitates searching; and wherein the format that facilitates searching comprises organizing the items into groups by product type, each of the groups having one entry per item identifier.

35. The computer program product of claim 32 wherein said computer program instructions are further for converting the data from the format facilitating maintenance of the data to a format that facilitates searching the data.

36. The computer program product of claim 35 wherein computer program instructions are further for creating a copy of the converted data.

37. The computer program product of claim 31 wherein computer program instructions are further for locking the data base to inhibit said modifying until said publishing and said republishing are completed.

38. The computer program product of claim 37 wherein said modifying and said republishing are performed routinely.

39. The computer program product of claim 31 wherein each of the rule sets are specific to one of the organizations.

40. The computer program product of claim 39 wherein said computer program instructions are further for searching the database and returning a set of item identifiers for each of the rule sets that meet the constraints specified by each rule set.

41. The computer program product of claim 31 wherein each of the rule sets is associated with a unique identifier, and each wherein each of the one or more organizations is assigned to a custom catalog by the rule set identifier of the rule set defining the scope of items in the custom catalog.

42. The computer program product of claim 31 wherein computer program instructions are further for:

establishing a primary hierarchy representative of the catalog items in the database; and generating a browse hierarchy for each of the custom catalogs, wherein each browse hierarchy is associated with one or more customer catalogs, is based on the primary hierarchy, and is representative of the subset of items included within the custom catalog associated with the browse hierarchy.

43. The computer program product of claim 31 wherein said computer program instructions are further for establishing pricing profiles for one or more of the organizations, each of the pricing profiles defining none, one or more adjustments to base prices ascribed to each of the catalog items in the database.

44. The computer program product of claim 43 wherein each of the pricing profiles specifies one or more constraint-based rules by which to identify the scope of items in the database for which each of the none, one or more pricing adjustments is to be applied.

45. The computer program product of claim 44 wherein said computer program instructions are further for searching the database and returning a set of item identifiers for each of the specified adjustments of each of the pricing profiles.

* * * * *